United States Patent
Dillman et al.

(10) Patent No.: US 10,030,737 B2
(45) Date of Patent: *Jul. 24, 2018

(54) LIMITING SYSTEM FOR A VEHICLE SUSPENSION COMPONENT

(71) Applicant: Oshkosh Defense, LLC, Oshkosh, WI (US)

(72) Inventors: Patrick S. Dillman, Hartford, WI (US); Erik S. Ellifson, Oshkosh, WI (US); Aaron J. Rositch, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/084,375

(22) Filed: Mar. 29, 2016

(65) Prior Publication Data
US 2016/0208883 A1 Jul. 21, 2016

Related U.S. Application Data

(63) Continuation of application No. 13/792,151, filed on Mar. 10, 2013, now Pat. No. 9,303,715.

(51) Int. Cl.
*F16F 9/49* (2006.01)
*B60G 17/08* (2006.01)
(Continued)

(52) U.S. Cl.
CPC ............ *F16F 9/49* (2013.01); *B60G 17/08* (2013.01); *F16F 9/16* (2013.01); *F16F 9/368* (2013.01);
(Continued)

(58) Field of Classification Search
CPC ........ F16F 7/00; F16F 7/09; F16F 9/00; F16F 9/3207; F16F 9/3214; F16F 9/368;
(Continued)

(56) References Cited

U.S. PATENT DOCUMENTS 2,214,038 A 9/1940 Beecher
2,653,681 A 9/1953 McIntyre
(Continued)

FOREIGN PATENT DOCUMENTS

JP 63-167137 7/1988

*Primary Examiner* — Melody M Burch
(74) *Attorney, Agent, or Firm* — Foley & Lardner LLP

(57) ABSTRACT

The damper assembly includes a tubular member, a rod, a primary piston, a secondary piston, and a resilient member. The tubular member includes a sidewall and a cap positioned at an end of the sidewall. The sidewall and the cap define an inner volume. The rod extends within the inner volume. The primary piston is positioned within the inner volume and coupled to the rod. The primary piston defines a first contact surface. The secondary piston includes a body member having a second contact surface, an opposing second surface, and an inner cylindrical face defining a central aperture that receives the rod. The secondary piston defines a channel extending from the inner cylindrical face to an outer periphery of the body member. The first contact surface and the channel are configured to cooperatively define a flow conduit upon engagement between the primary piston and the secondary piston.

17 Claims, 17 Drawing Sheets

(51) Int. Cl.
  *F16F 9/36* (2006.01)
  *F16F 9/512* (2006.01)
  *F16F 9/16* (2006.01)
  *F16F 15/16* (2006.01)

(52) U.S. Cl.
  CPC ............ *F16F 9/512* (2013.01); *F16F 15/161* (2013.01); *F16F 2222/12* (2013.01)

(58) Field of Classification Search
  CPC ...... F16F 9/512; F16F 9/16; F16F 9/49; F16F 13/00; F16F 15/02; F16F 15/023; F16F 15/16; F16F 15/161; F16F 2222/12; F16F 2238/04
  USPC .............. 188/313, 316, 317, 322.13, 322.15, 188/322.16, 322.18; 267/64.11; 137/625.12
  See application file for complete search history.

(56) References Cited

U.S. PATENT DOCUMENTS

| | | | |
|---|---|---|---|
| 2,783,859 A | 3/1957 | Patriquin | |
| 2,985,319 A | 5/1961 | Simmons | |
| 3,000,625 A | 9/1961 | Polhemus | |
| 3,175,645 A | 3/1965 | Schafer et al. | |
| 3,341,189 A | 9/1967 | Rumsey | |
| 3,376,957 A | 4/1968 | Baumgartner | |
| 3,439,913 A | 4/1969 | Kamman | |
| 3,446,317 A | 5/1969 | Gryglas | |
| 3,447,644 A | 6/1969 | Duckett | |
| 3,731,770 A | 5/1973 | Bindon | |
| 3,750,856 A | 8/1973 | Kenworthy | |
| 4,150,819 A | 4/1979 | Taylor | |
| 4,284,177 A | 8/1981 | Domek | |
| 4,383,595 A | 5/1983 | Schnitzius | |
| 4,591,031 A | 5/1986 | Kirst | |
| 4,796,871 A | 1/1989 | Bauer et al. | |
| 4,899,853 A | 2/1990 | Hummel | |
| 5,024,301 A | 6/1991 | Cook | |
| 5,040,645 A | 8/1991 | Volpel et al. | |
| 5,234,084 A | 8/1993 | Bell | |
| 5,503,258 A * | 4/1996 | Clarke | F16F 9/48 188/266.5 |
| 6,053,486 A | 4/2000 | Schuitema et al. | |
| 6,129,343 A | 10/2000 | Ecarnot | |
| 8,205,729 B2 | 6/2012 | Miyasato et al. | |
| 8,333,390 B2 | 12/2012 | Linsmeier et al. | |
| 8,459,619 B2 | 6/2013 | Trinh et al. | |
| 8,465,025 B2 | 6/2013 | Venton-Walters et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,821,130 B2 | 9/2014 | Venton-Walters et al. | |
| 8,876,133 B2 | 11/2014 | Ellifson | |
| 8,947,531 B2 | 2/2015 | Fischer et al. | |
| 8,991,834 B2 | 3/2015 | Venton-Walters et al. | |
| 9,045,014 B1 | 6/2015 | Verhoff et al. | |
| 9,127,738 B2 | 9/2015 | Ellifson et al. | |
| 9,145,905 B2 | 9/2015 | Hou | |
| 9,174,686 B1 | 11/2015 | Messina et al. | |
| 9,291,230 B2 | 3/2016 | Ellifson et al. | |
| 9,303,715 B2 | 4/2016 | Dillman et al. | |
| 2005/0051935 A1* | 3/2005 | Lanterman | B21D 24/02 267/119 |
| 2010/0140031 A1 | 6/2010 | Miyasato | |
| 2010/0236882 A1 | 9/2010 | Uchiyama | |
| 2012/0160620 A1 | 6/2012 | Yamashita et al. | |
| 2012/0160624 A1 | 6/2012 | Katayama et al. | |
| 2012/0247890 A1 | 10/2012 | Murakami | |
| 2012/0312648 A1 | 12/2012 | Yu et al. | |
| 2012/0318623 A1 | 12/2012 | Mombour | |
| 2015/0290993 A1 | 10/2015 | Dillman et al. | |

* cited by examiner

LIMITING SYSTEM FOR A VEHICLE SUSPENSION COMPONENT

CROSS-REFERENCE TO RELATED PATENT APPLICATIONS

This application is a continuation of U.S. application Ser. No. 13/792,151, filed Mar. 10, 2013, now U.S. Pat. No. 9,303,715, which is incorporated herein by reference in its entirety.

BACKGROUND

The present application generally relates to vehicle suspension systems. In particular, the present application relates to dampers having a system to reduce impulse forces as the vehicle suspension system experiences a jounce event or a recoil event. Dampers (i.e. dashpots, hydraulic shock absorbers, etc.) dissipate kinetic energy as part of a vehicle suspension system. Dampers often include a housing, end caps, a piston, and a rod that is coupled to the piston. Energy is dissipated as hydraulic fluid flows along a hydraulic circuit (e.g., between a first chamber within the housing to a second chamber within the housing). The piston may include a plurality of orifices that are covered with a shim stack having a plurality of compressed shims.

As the piston moves through the housing, hydraulic fluid is forced from a first chamber, through the piston, and into the second chamber. Specifically, pressurized hydraulic fluid is forced through the orifices within the piston, deflects a portion of the shims to create an opening, and flows into the second chamber by passing through the opening. Such traditional dampers provide damping forces that are constant between a first end of stroke (e.g., extension) and a second end of stroke (e.g., compression). Where the vehicle interacts with an obstacle, a force is imparted into the piston through the rod of the damper. The piston translates toward an end of the damper and may impart a large impulse force on the end cap. Such large forces may cause damage to the piston, the end cap, the walls of the housing, or still other components of the damper assembly. Large impulse forces are also transferred to occupants within the vehicle.

Traditional dampers may include a limiting system that absorbs or dissipates energy thereby reducing the impulse forces imparted on occupants of the vehicle. Some limiting systems absorb and store energy (e.g., using a spring, a gas chamber, etc.) as the piston moves toward the end of stroke. Such a spring may produce up to 30,000 pounds of force with one inch of displacement. The stored energy is thereafter transferred to another component (e.g., the piston, the rod, etc.) as the piston moves toward the opposing end of the housing. While still other limiting systems dissipate energy, such systems provide flow paths through flow orifices within the primary piston and along the damper piston. These limiting systems are susceptible to obstruction due to debris and may generate inconsistent damping forces.

SUMMARY

One embodiment relates to a damper assembly. The damper assembly includes a tubular member, a rod, a primary piston, a secondary piston, and a resilient member. The tubular member includes a sidewall and a cap positioned at an end of the sidewall. The sidewall and the cap define an inner volume. The sidewall includes a shoulder separating the tubular member into a first portion and a second portion. The rod extends within the inner volume. The primary piston is positioned within the inner volume and coupled to the rod. The primary piston defines a first contact surface. The secondary piston includes a body member having a second contact surface, an opposing second surface, and an inner cylindrical face defining a central aperture that receives the rod. The secondary piston defines a channel extending from the inner cylindrical face to an outer periphery of the body member. The resilient member is disposed between the secondary piston and the cap and thereby positioned to bias the secondary piston into engagement with the shoulder. The first contact surface and the channel are configured to cooperatively define a flow conduit upon engagement between the primary piston and the secondary piston.

Another embodiment relates to a damper assembly. The damper assembly includes a housing, a primary piston, a limiter, and a rod. The housing has an end cap and defines an inner volume including a first portion and a second portion. The transition between the first portion and the second portion defines a shoulder. The primary piston is positioned within the housing. The limiter is positioned between the primary piston and the end cap. The limiter includes a damper piston and a resilient member. The damper piston includes a body member having a contact surface, an opposing second surface, and an inner cylindrical face that defines an aperture through a central portion of the body member. The primary piston and the damper piston separate the inner volume into a first working chamber, a second working chamber, and a recoil chamber. The resilient member is disposed within the recoil chamber, between the opposing second surface of the damper piston and the end cap. The resilient member is thereby positioned to bias the damper piston into engagement with the shoulder. The rod is coupled to the primary piston and extends through the aperture defined by the damper piston. The damper piston at least partially forms an open flow path from the recoil chamber.

Yet another embodiment relates to a suspension system. The suspension system includes a wheel end and a damper. The wheel end is configured to interface with a ground surface. The damper is coupled to the wheel end. The damper includes a tubular member, a rod, a primary piston, a secondary piston, and a resilient member. The tubular member includes a sidewall and a cap positioned at an end of the sidewall. The sidewall and the cap define an inner volume. The sidewall includes a shoulder separating the tubular member into a first portion and a second portion. The rod extends within the inner volume. The primary piston is positioned within the inner volume and coupled to the rod. The primary piston defines a first contact surface. The secondary piston includes a body member having a second contact surface, an opposing second surface, and an inner cylindrical face defining a central aperture that receives the rod. The secondary piston defines a channel extending from the inner cylindrical face to an outer periphery of the body member. The resilient member is disposed between the secondary piston and the cap and thereby positioned to bias the secondary piston into engagement with the shoulder. The first contact surface and the channel are configured to cooperatively define a flow conduit upon engagement between the primary piston and the secondary piston.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
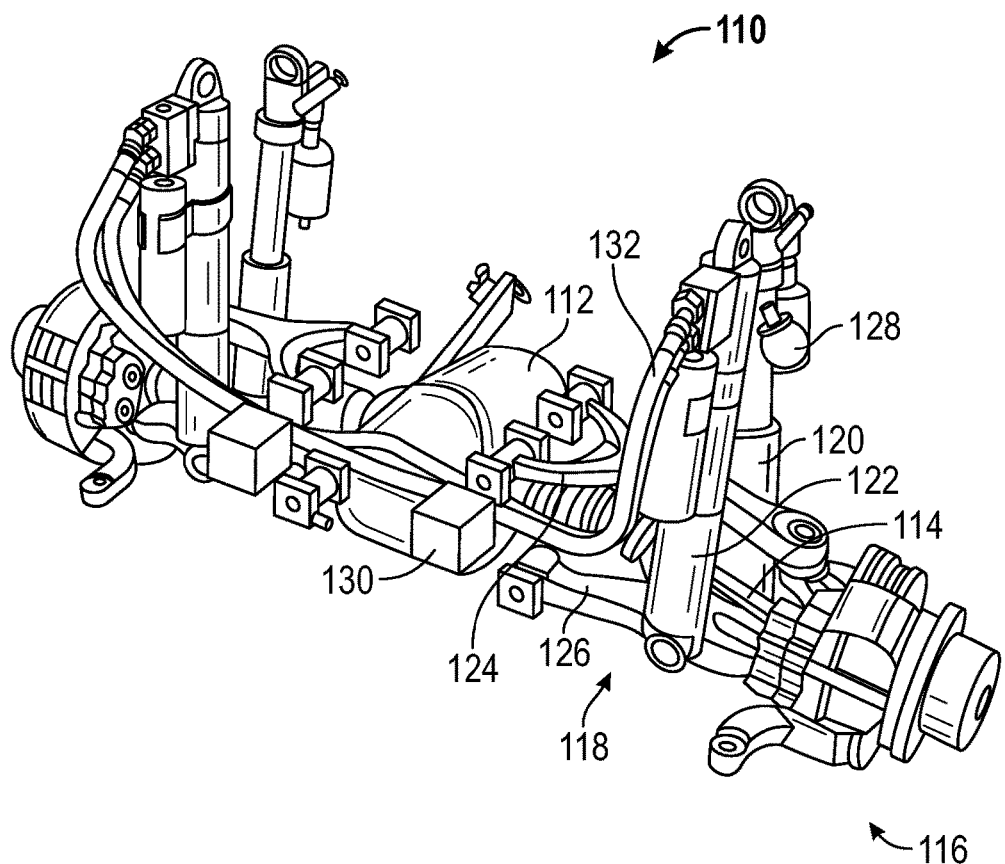
FIG. 1 is an elevation view of an axle assembly, according to an exemplary embodiment.

Referring to the exemplary embodiment shown in FIG. 1, an axle assembly 110 is configured to be included as part of a vehicle. The vehicle may be a military vehicle, a utility vehicle (e.g., a fire truck, a tractor, construction equipment, a sport utility vehicle, etc.), or still another type of vehicle. As shown in FIG. 1, axle assembly 110 includes a differential 112 coupled to a half shaft 114. As shown in FIG. 1, half shaft 114 is coupled to a wheel end assembly 116. The wheel end assembly 116 may include brakes, a gear reduction, steering components, a wheel hub, a wheel, a tire, and other features. According to an exemplary embodiment, the differential 112 is configured to be coupled to a drive shaft of the vehicle. Such a differential 112 may receive rotational energy from a prime mover (e.g., a diesel engine, a gasoline engine, an electric motor, etc.) of the vehicle. The differential 112 then allocates torque provided by the prime mover between the half shafts 114 of the axle assembly 110. The half shafts 114 deliver the rotational energy to each wheel end assembly 116. According to an alternative embodiment, each wheel end assembly 116 includes a prime mover (e.g., the axle assembly 110 includes electric motors that each drive one wheel).

According to an exemplary embodiment, the axle assembly 110 includes a suspension system 118 that couples the chassis of the vehicle to wheel end assembly 116. In some embodiments, the chassis includes a pair of opposing frame rails, and the suspension system 118 engages the opposing frame rails through side plate assemblies. In other embodiments, the chassis is a hull, a capsule, or another type of structural member. According to an exemplary embodiment, the suspension system 118 includes a spring, shown as gas spring 120, and a damper, shown as hydraulic damper 122. As shown in FIG. 1, the gas spring 120 and the hydraulic damper 122 are coupled in parallel to a lower support member, shown as lower swing arm 126. According to an exemplary embodiment, the wheel end assembly 116 is coupled to lower swing arm 126 and an upper support member, shown as upper swing arm 124.

According to an exemplary embodiment, the vehicle is configured for operation on both smooth (e.g., paved) and uneven (e.g., off-road, rough, etc.) terrain. As the vehicle travels over uneven terrain, the upper swing arm 124 and the lower swing arm 126 guide the vertical movement of the wheel end assembly 116. A stop, shown as cushion 128, provides an upper bound to the movement of the wheel end assembly 116. It should be understood that axle assembly 110 may include similar components (e.g., wheel end assemblies, suspension assemblies, swing arms, etc.) for each of the two opposing lateral sides of a vehicle.

Figure 2:
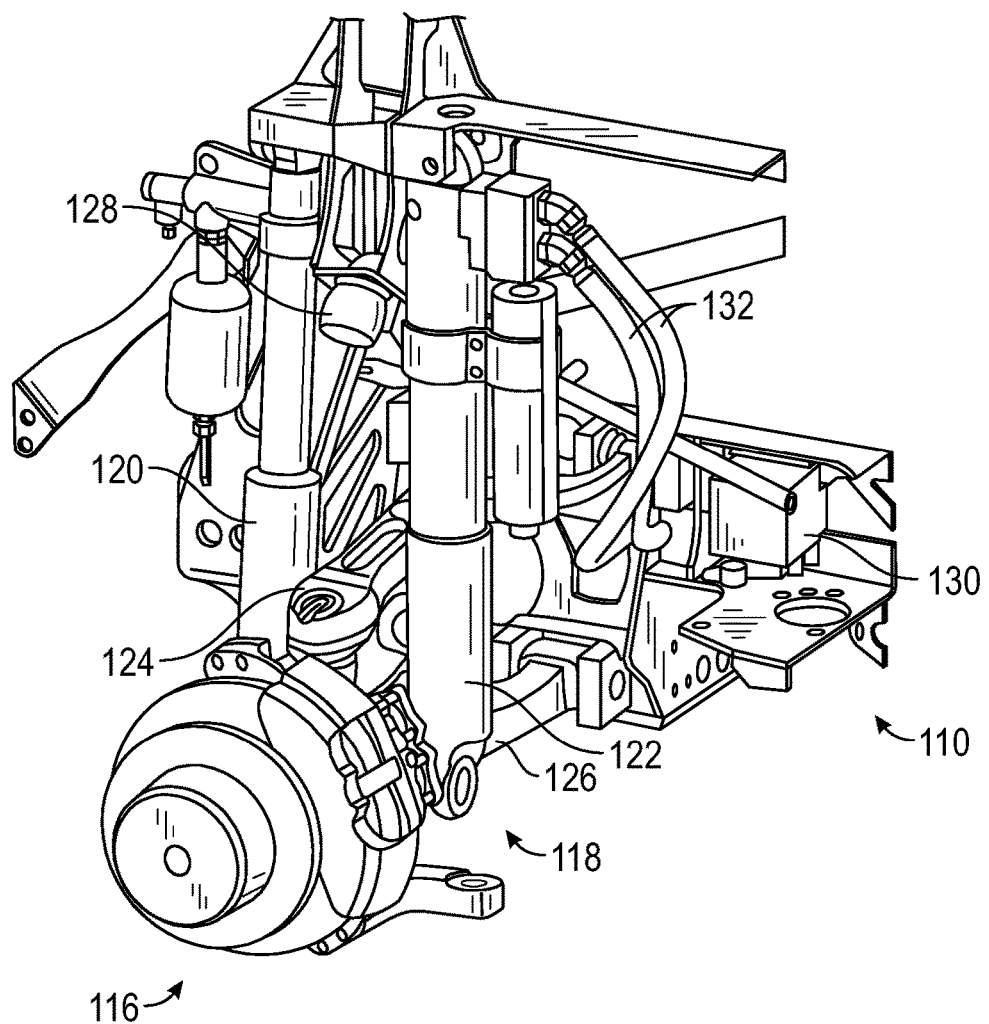
FIG. 2 is an elevation view of a suspension system, according to an exemplary embodiment.

Referring next to the exemplary embodiment shown in FIG. 2, the suspension system 118 includes various components configured to improve performance of the vehicle. As shown in FIG. 2, gas spring 120 is a high pressure gas spring. According to an exemplary embodiment, the suspension system 118 includes a pump, shown as high-pressure gas pump 130, that is coupled to gas spring 120. In some embodiments, suspension system 118 includes a plurality of high-pressure gas pumps 130 each coupled to a separate gas spring 120. In other embodiments, the suspension system 118 includes fewer high-pressure gas pumps 130 than gas springs 120. According to an exemplary embodiment, the gas spring and the pump include gas made up of at least 90% inert gas (e.g., nitrogen, argon, helium, etc.). The gas may be stored, provided, or received in one or more reservoirs (e.g., tank, accumulators, etc.). During operation, the high-pressure gas pump 130 selectively provides gas, under pressure, to at least one of the gas springs 120 and the reservoir. In some embodiments, at least one of the gas springs 120 and the hydraulic dampers 122 receive and provide a fluid (e.g., gas, hydraulic fluid) to lift or lower the body of the vehicle with respect to the ground thereby changing the ride height of the vehicle.

Figure 3:
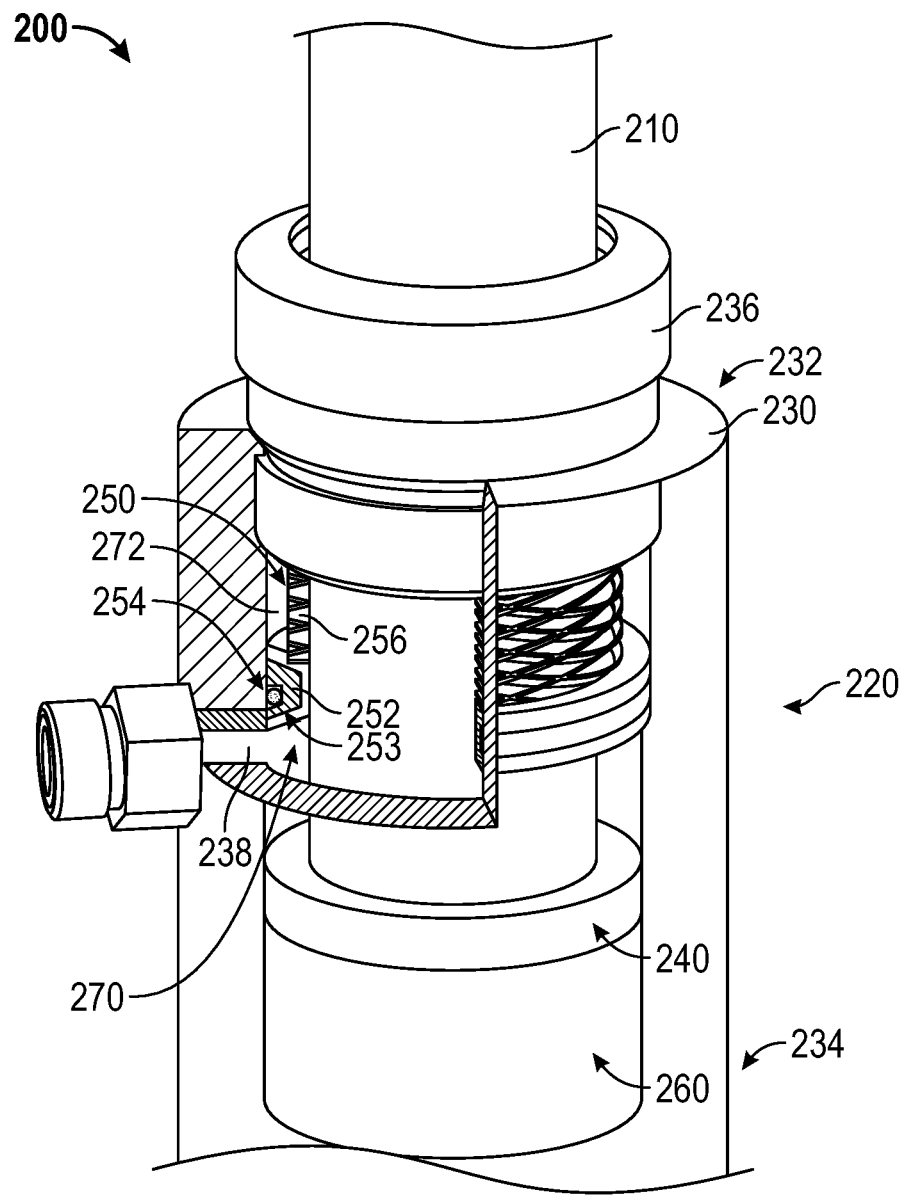
FIG. 3 is an elevation view of a damper having a limiter that dissipates energy, according to an exemplary embodiment.

According to the exemplary embodiment shown in FIG. 3, a suspension component, shown as damper 200 includes a rod, shown as shaft 210, coupled to a body portion 220. As shown in FIG. 3, body portion 220 includes a tubular member, shown as housing 230, that includes a first end 232 and a second end 234. An end cap 236 is coupled to first end 232 of housing 230. Housing 230 includes a sidewall defines an inner volume, and shaft 210 translates within the inner volume between an extended position and a retracted position. According to an exemplary embodiment, a piston, shown as plunger 240, is positioned within the inner volume of housing 230 and coupled to an end of shaft 210. A limiter, shown as recoil damper 250, is disposed within the inner volume of housing 230 between plunger 240 and end cap 236. Recoil damper 250 is intended to reduce the risk of damage to plunger 240, end cap 236, the sidewall of housing 230, or still another component of damper 200 by reducing the forces imparted by plunger 240 as it travels toward an end of stroke. Occupants within a vehicle experience large impulse forces as plunger 240 contacts end cap 236 or a component of the suspension system engages a hard stop. Recoil damper 250 reduces such impulse forces transmitted to occupants within the vehicle by dissipating a portion of the kinetic energy of plunger 240 and shaft 210 (i.e. provide a supplemental damping force) as damper 200 reaches an end of stroke (e.g., as the piston reaches a recoil end of stroke, as the piston reaches a jounce end of stroke, etc.). According to an exemplary embodiment, recoil damper 250 reduces the forces imparted by an obstacle to occupants within the vehicle from 35,000 pounds to 20,000 pounds.

According to an exemplary embodiment, recoil damper 250 dissipates energy thereby reducing the total energy of damper 200. As the vehicle encounters a positive obstacle (e.g., a bump, a curb, etc.) or a negative obstacle (e.g., a depression, etc.), the shaft 210 moves relative to housing 230. Various factors including, among others, the speed of the vehicle, the weight of the vehicle, and the characteristics of the obstacle affect the energy imparted into the damper 200 by the obstacle. By way of example, shaft 210 translates toward first end 232 of housing 230 as a wheel of the vehicle encounters a negative obstacle. It should be understood that the moving shaft 210 possesses kinetic energy that contributes to the total energy of damper 200. Interaction of recoil damper 250 with plunger 240 dissipates energy thereby reducing the total energy of damper 200. Such dissipated energy does not increase the kinetic energy of shaft 210 or plunger 240, according to an exemplary embodiment.

Referring again to the exemplary embodiment shown in FIG. 3, plunger 240 separates the inner volume of housing 230 into a compression chamber 260 and an extension chamber 270. As shown in FIG. 3, housing 230 also defines a port, shown as flow port 238. According to an exemplary embodiment, a fluid (e.g., hydraulic oil, water, a gas, etc.) is disposed within the inner volume of housing 230. As plunger 240 moves toward first end 232 of housing 230, the pressure of the fluid within extension chamber 270 increases. According to an exemplary embodiment, the fluid within extension chamber 270 flows outward through flow port 238. External valves (e.g. shim valves, etc.) restrict the flow of fluid from flow port 238 and provide a base level of damping forces. Such a base level of damping may vary based on the location, speed, or other characteristics of plunger 240. According to an exemplary embodiment, damper 200 provides a constant base level damping force as plunger 240 translates between first end 232 and second end 234 of housing 230.

According to an exemplary embodiment, recoil damper 250 includes a piston, shown as secondary plunger 252. As shown in FIG. 3, secondary plunger 252 is an annular member positioned within extension chamber 270. Secondary plunger 252 includes a contact surface that is configured to engage plunger 240. An opposing surface of secondary plunger 252 is separated from the contact surface by the thickness of secondary plunger 252. According to an exemplary embodiment, secondary plunger 252 is coupled to an inner sidewall of housing 230 with a seal (e.g., ring, wear band, guide ring, wear ring, etc.), shown as interfacing member 254. A recoil chamber 272 is formed by the volume of extension chamber 270 located between secondary plunger 252 and end cap 236.

As shown in FIG. 3, interfacing member 254 is a ring that has a circular cross-sectional shape. According to an alternative embodiment, interfacing member 254 may have a rectangular, square, polygonal, or still other cross-sectional shape. The interfacing member 254 is manufactured from a rigid material (e.g., a hard plastic, etc.). According to an exemplary embodiment, the rigid interfacing member 254 prevents fluid flow between the inner sidewall of housing 230 and secondary plunger 252. A rigid interfacing member 254 may also center secondary plunger 252 within the bore of housing 230 thereby reducing the likelihood of wear between an outer surface of secondary plunger 252 and housing 230. According to an alternative embodiment, interfacing member 254 is manufactured from another material (e.g., glass reinforced nylon, a nitrile rubber, etc.).

According to an exemplary embodiment, recoil damper 250 includes a resilient member, shown as return spring 256. As shown in FIG. 3, return spring 256 extends between a first end that engages secondary plunger 252 and a second end that engages end cap 236. Return spring 256 may be an interlaced wave spring (i.e. a flat wire compression spring), a coil spring, or another type of spring. Return spring 256 positions secondary plunger 252 within housing 230. The spring force generated by return spring 256 may overcome gravity (e.g., where damper 200 is positioned in a vehicle suspension system with secondary plunger 252 above end cap 236) or may position secondary plunger 252 more quickly than gravity alone (e.g., where damper 200 is positioned in a vehicle suspension system with secondary plunger 252 below end cap 236, as shown in FIG. 3). Return spring 256 is not intended to damp the movement of plunger 240, and return spring 256 may have a relatively small spring constant (e.g., less than 500 pounds per inch). According to an alternative embodiment, recoil damper 250 does not include a return spring 256. Such a recoil damper may reposition secondary plunger 252 using gravity or an alternative device.

According to an exemplary embodiment, secondary plunger 252 defines a channel (i.e. track, depression, kerf, notch, opening, recess, slit, etc.), shown as damping groove 253. As shown in FIG. 3, damping groove 253 extends radially outward across the contact surface of secondary plunger 252, along an inner cylindrical face of secondary plunger 252, and along the opposing surface of secondary plunger 252. According to an alternative embodiment, damping groove 253 extends only along the contact surface of secondary plunger 252. According to still another alternative embodiment, damping groove 253 extends across the contact surface and along the inner cylindrical face of secondary plunger 252. As shown in FIG. 3, secondary plunger 252 defines two damping grooves 253. According to an alternative embodiment, secondary plunger 252 defines more or fewer damping grooves 253. Damping groove 253 is sized to provide particular flow characteristics. According to an exemplary embodiment, the channel is defined along an axis extending radially outward from a centerline of secondary plunger 252. According to an alternative embodiment, the channel is curvilinear or irregularly shaped. According to an exemplary embodiment, the channel has a square cross-sectional shape in a plane that is normal to the axis extending from the centerline of secondary plunger 252. According to an alternative embodiment, the channel has another cross-sectional shape (e.g., rectangular, circular, semicircular, parabolic, etc.).

As shown in FIG. 3, plunger 240 defines a contact surface that engages the contact surface of secondary plunger 252. According to an exemplary embodiment, the contact surface of plunger 240 and the contact surface of secondary plunger 252 are complementary (i.e. corresponding, matched, correlative, etc.) thereby reducing the likelihood that pressurized fluid will seep between recoil chamber 272 and extension chamber 270 across the contact surfaces of plunger 240 and secondary plunger 252. According to an alternative embodiment, a seal is positioned between plunger 240 and secondary plunger 252.

According to an alternative embodiment, shaft 210 does not extend through secondary plunger 252. Such a damper 200 may include a shaft 210 that projects toward second end 234 of housing 230 from plunger 240. A limiter (e.g., a recoil damper) may be positioned between plunger 240 and end cap 236. The limiter may provide supplemental damping forces as plunger 240 approaches an end of stroke (e.g., full compression). According to an exemplary embodiment, plunger 240 and second plunger 252 are disk shaped. According to an alternative embodiment, plunger 240 and second plunger 252 have still another shape.

According to an exemplary embodiment, the various components of damper 200 (e.g., the sidewall of housing 230, plunger 240, secondary plunger 252, shaft 210, etc.) have a circular cross section. According to an alternative embodiment, the various components of damper 200 may include a different cross-sectional shape (e.g., rectangular, square, hexagonal, etc.). While shown in FIG. 3 as having a particular length, width, and thickness, it should be understood that the components of damper 200 may be otherwise sized (e.g., to suit a particular application).

Figure 4A:
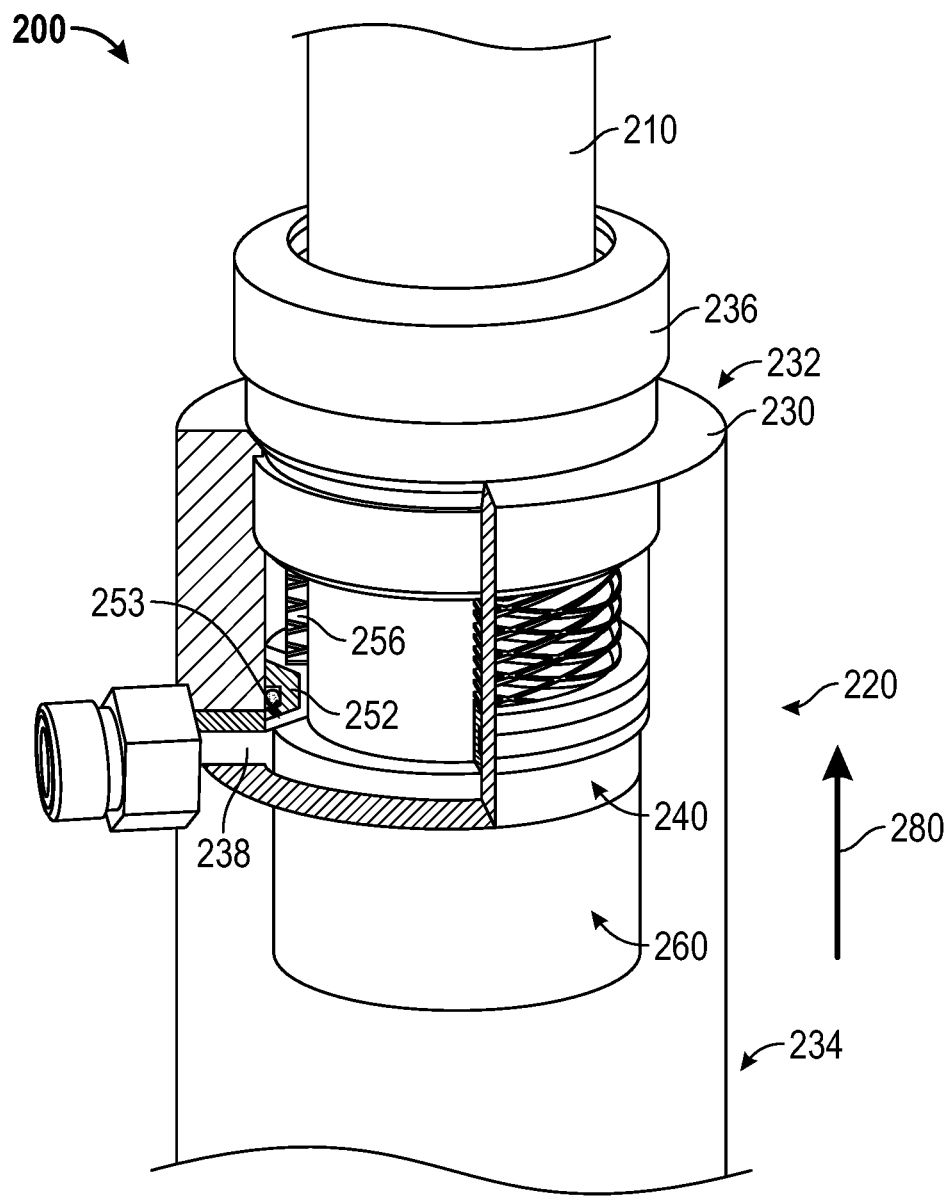
FIGS. 4A-4D are elevation views of a damper in various stages of compression, according to an exemplary embodiment.
Figure 4B:
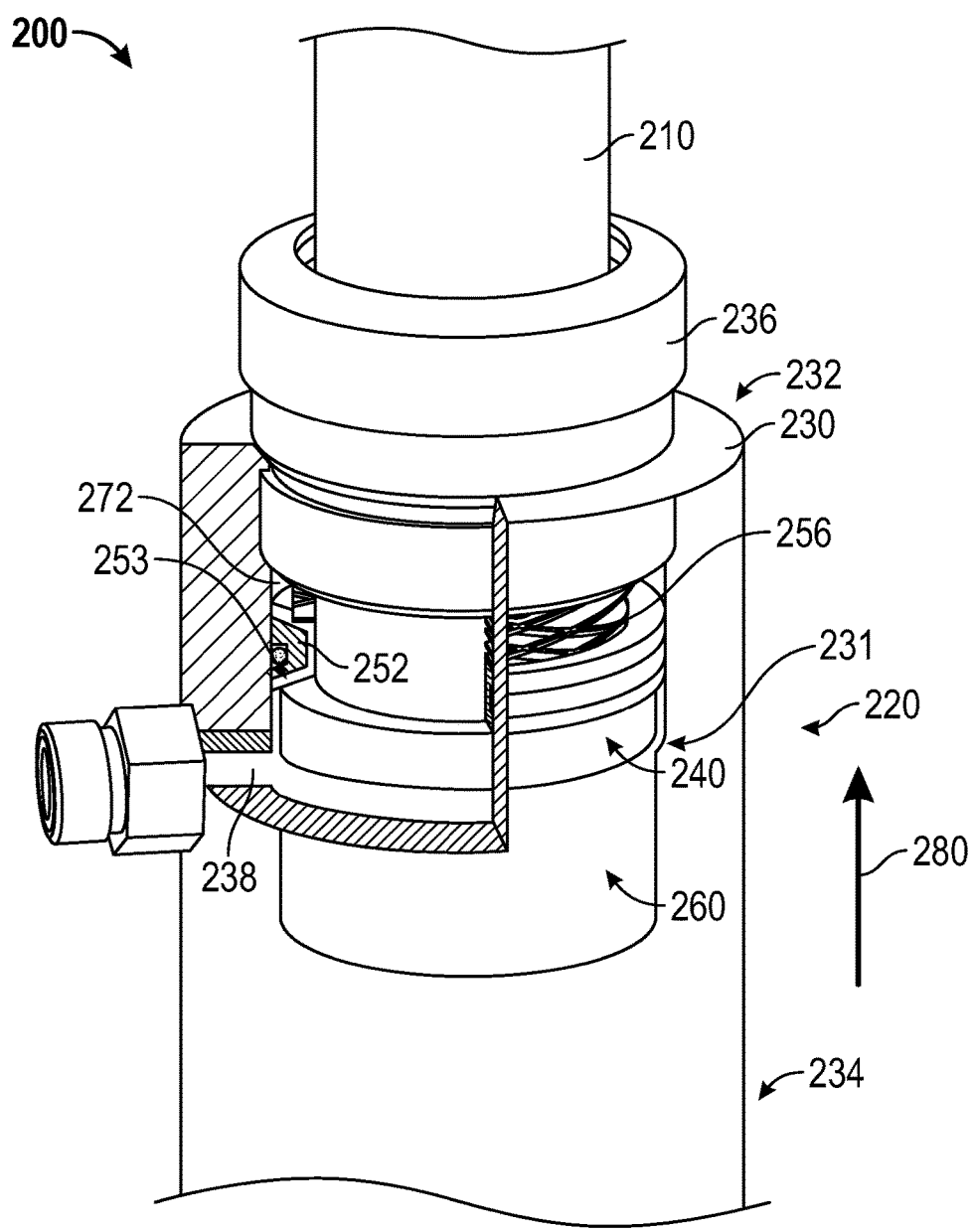
Figure 4C:
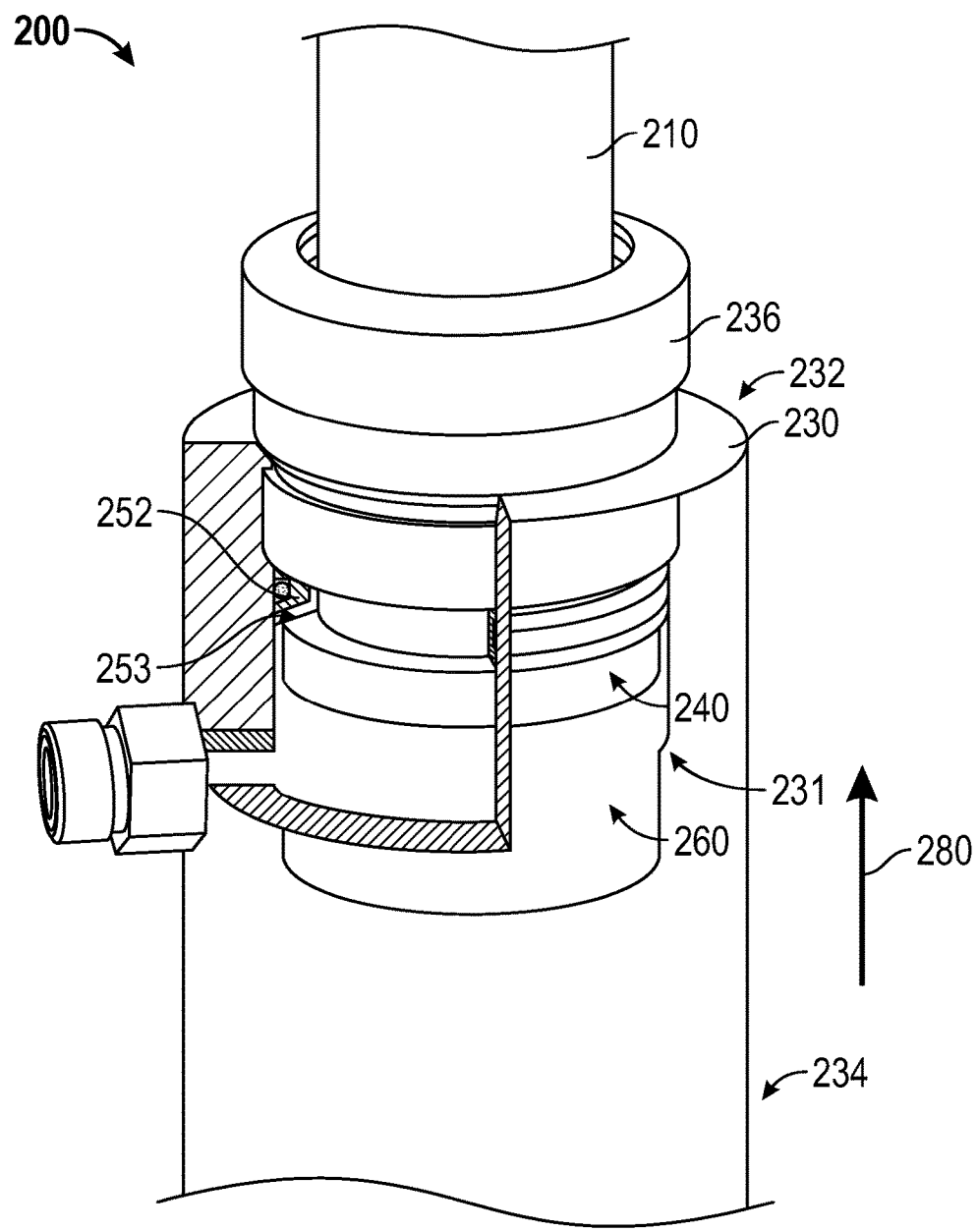
Figure 4D:
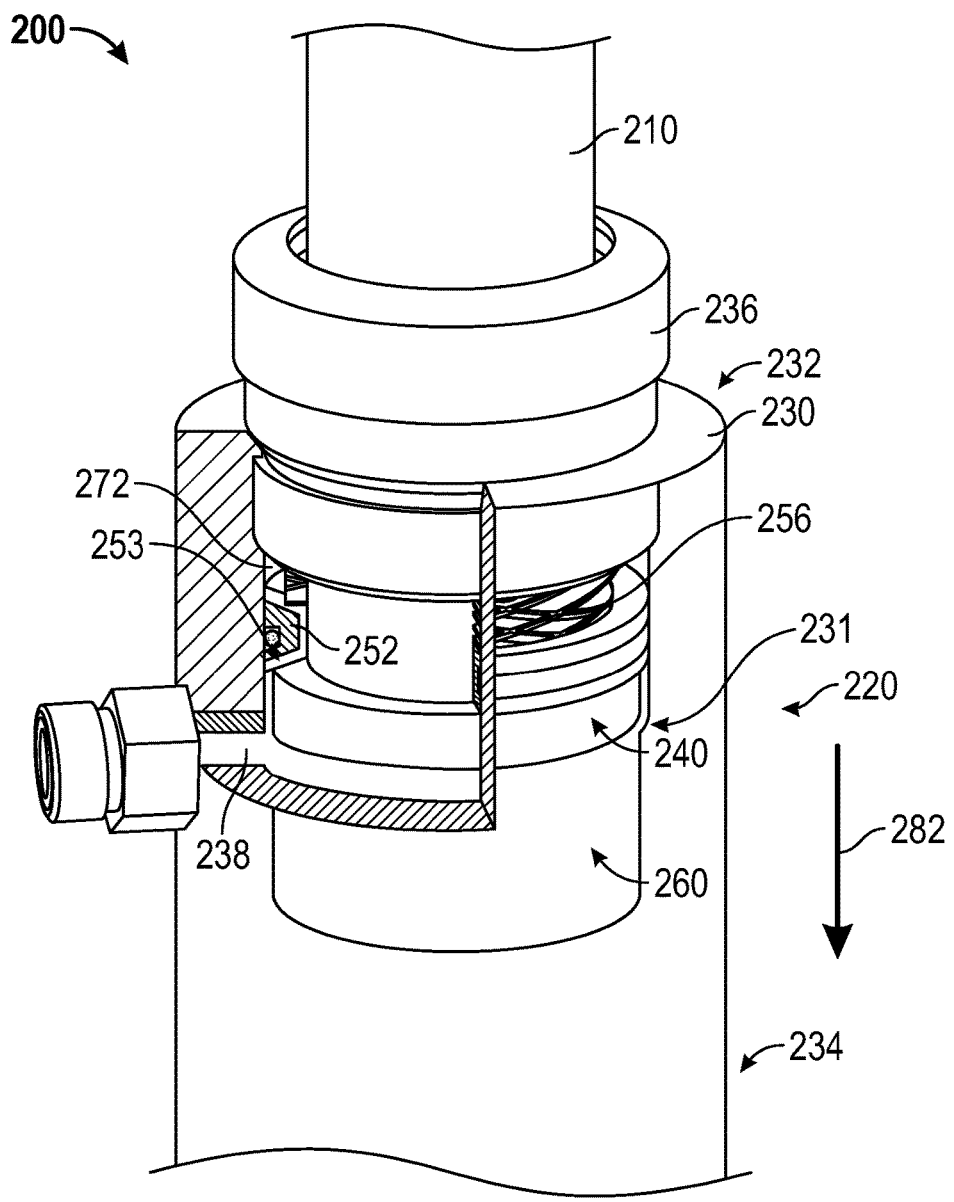

According to the exemplary embodiment shown in FIGS. 3-4D, plunger 240 is actuable within housing 230 from a first location that is offset from secondary plunger 252 (e.g., the position shown in FIG. 3) to a second position where the contact surface of plunger 240 engages with (i.e. contacts, interfaces with, etc.) the contact surface of secondary plunger 252 (e.g., the position shown in FIG. 4A). As shown in FIG. 4A, plunger 240 translates within housing 230 along a direction of travel 280. Such motion may occur, by way of example, as the damper 200 approaches an extension end of stroke (e.g., in a recoil motion). As shown in FIG. 4A, plunger 240 moves along direction of travel 280 such that the contact surface of plunger 240 engages the contact surface of secondary plunger 252. As the contact surface of plunger 240 engages the contact surface of secondary plunger 252, the damping groove 253 of secondary plunger 252 and the contact surface of plunger 240 form a flow conduit.

According to an alternative embodiment, plunger 240 defines a channel. The channel of plunger 240 may correspond to damping groove 253 of plunger 240 such that the channel of plunger 240 and damping groove 253 of secondary plunger 252 together form a flow conduit. In other embodiments, the channel of plunger 240 does not correspond to damping groove 253 of plunger 240 such that a plurality of flow conduits are formed between the damping groove 253 and the contact surface of plunger 240 and the channels of plunger 240 and the contact surface of secondary plunger 252. According to another alternative embodiment, secondary plunger 252 does not include damping groove 253, and a channel defined within plunger 240 and a contact surface of plunger 240 form the flow conduit.

As plunger 240 translates between the position shown in FIG. 4A to the position shown in FIG. 4B, fluid flows from recoil chamber 272, between secondary plunger 252 and shaft 210, through the conduit defined by damping groove 253 and the contact surface of plunger 240, through a passage between plunger 240 and the sidewall of housing 230, and into compression chamber 260. According to an exemplary embodiment, the conduit restricts the flow of fluid from recoil chamber 272 thereby dissipating energy and providing a supplemental damping force. According to an exemplary embodiment, damping groove 253 is positioned to reduce the buildup of debris and maintain an unobstructed flow channel along the conduit formed by damping groove 253 and the contact surface of plunger 240. Wear between components of damper 200, oxidation, or still other conditions may generate debris in the fluid of damper 200. As shown in FIGS. 3-4D, damping groove 253 is defined across a contact surface of secondary plunger 252. Fluid flowing through the inner volume of housing 230 (e.g., due to translation of plunger 240 within housing 230) flushes debris from damping groove 253. Such flushing and the movement of shaft 210 relative to secondary plunger 252 reduce the risk of debris obstructing the fluid flow path between recoil chamber 272 and compression chamber 260 (e.g., between an inner surface of secondary plunger 252 and an outer surface of shaft 210).

According to an exemplary embodiment, the amount of energy dissipated and the supplemental damping forces provided by recoil damper 250 (e.g., due to fluid flow through the conduit) is related to the shape of damping groove 253. According to an exemplary embodiment, fluid flow does not occur between secondary plunger 252 and the sidewall of housing 230. Secondary plunger 252 and interfacing member 254 limit fluid flow between recoil chamber 272 and compression chamber 260 to a flow path through the conduit. Recoil damper 250 thereby generates a fluid flow path through the conduit, and interfacing member 254 facilitates determining the expected performance characteristics (e.g., the amount of energy dissipated, the supplemental damping forces provided, etc.) of recoil damper 250. Such performance characteristics may be tuned as a function only of the features of damping groove 253, according to an exemplary embodiment. Limiting fluid from flowing between secondary plunger 252 and an inner sidewall of housing 230 also provides more predictable and uniform energy dissipation and supplemental damping forces (i.e. additional flow paths may introduce additional variability into the energy dissipated by a limiter).

Referring next to FIG. 4C, plunger 240 maintains engagement with secondary plunger 252 and continues to translate along direction of travel 280. According to an exemplary embodiment, the end cap 236 is a hard stop for the motion of damper 200 at an end of stroke (e.g., extension, compression, etc.). As shown in FIG. 4C, end cap 236 is a hard stop for an extension end of stroke for damper 200. According to an exemplary embodiment, the extension forces from plunger 240 and shaft 210 are imparted to end cap 236 through secondary plunger 252. The secondary plunger 252 and the flow of fluid through the conduit reduces the magnitude of the extension forces and the total energy imparted on cap 236 by plunger 240 and shaft 210.

According to an exemplary embodiment, end cap 236 includes a contact end 237 and has a cylindrical shape that defines an inner volume. The opposing surface of secondary plunger 252 engages contact end 237 of end cap 236 to limit further movement of plunger 240 and shaft 210 along direction of travel 280. It should be understood that return spring 256 compresses as plunger 240 and secondary plunger 252 travel toward end cap 236. According to an exemplary embodiment, return spring 256 has an outer diameter that is smaller than contact end 237 of end cap 236 such that return spring 256 extends within the inner volume of end cap 236. Return spring 256 nests within the inner volume of cap 236 as plunger 240 and secondary plunger 252 translate toward end cap 236 along direction of travel 280.

According to an alternative embodiment, a vehicle suspension system includes an external hard stop that interfaces with another suspension component. By way of example, the suspension system may include a polymeric cushion coupled to a chassis of the vehicle that contacts a swing arm. Secondary plunger 252 in such a suspension system may not contact end cap 236 (i.e. the end of stroke for the installed damper 200 may occur before maximum extension). According to an alternative embodiment, the suspension system includes an external hard stop (e.g., a polymeric cushion) and also a secondary plunger 252 that engages end cap 236 to distribute the total stopping forces to various suspension components. According to still another alternative embodiment, damper 200 includes another type of internal hard stop (e.g., a snap ring positioned within and internal groove of housing 230, a stud protruding into the inner volume of housing 230, etc.). The internal hard stop may engage plunger 240, secondary plunger 252, or still another component of damper 200.

Referring next to FIG. 4D, plunger 240 translates along direction of travel 282 and away from secondary plunger 252. By way of example, such motion may occur after the vehicle has encountered a negative obstacle as the wheel end begins to travel upward thereby compressing damper 200. According to an alternative embodiment, the motion of plunger 240 away from secondary plunger 252 occurs after the vehicle has encountered a positive obstacle and the wheel end begins to travel downward thereby extending damper 200 (e.g., where recoil damper 250 is incorporated to dissipate energy at a jounce end of stroke). Translation of plunger 240 along direction of travel 282 increases the pressure of the fluid within compression chamber 260 and decreases the pressure of the fluid within recoil chamber 272 and extension chamber 270. Fluid flows into extension chamber 270 through flow port 238 as plunger 240 translates along direction of travel 282, according to an exemplary embodiment.

As shown in FIG. 4D, the sidewall of housing 230 includes first portion having a first diameter and a second portion having a second diameter, the transition between the first diameter and the second diameter forming a shoulder, shown as step 231. According to an exemplary embodiment, the length of the first portion defines the distance over which recoil damper 250 dissipates energy and provides a supplemental damping force. As shown in FIG. 4D, secondary plunger 252 is coupled to the first portion with interfacing member 254. As shown in FIG. 4D, the diameter of secondary plunger 252 is greater than the second diameter such that the secondary plunger 252 translates only within the first portion of housing 230. Step 231 thereby limits the motion of secondary plunger 252 and prevents secondary plunger 252 from sliding (e.g., due to gravity, due to locking forces between secondary plunger 252 and plunger 240, etc.) toward the second end 234 of housing 230. According to an exemplary embodiment, plunger 240 has a diameter that is approximately equal to the second diameter and is configured to translate along both the first portion and the second portion of housing 230. In some embodiments, plunger 240 is coupled to housing 230 with an intermediate seal.

According to an exemplary embodiment, return spring 256 includes a first end coupled to end cap 236 and a second end coupled to secondary plunger 252. As plunger 240 translates along direction of travel 282, return spring 256 extends from a contracted position (e.g., nested within end cap 236) to an extended position. According to an exemplary embodiment, the contact surface of secondary plunger 252 engages step 231 when return spring 256 is in the extended position. The extension of return spring 256 repositions secondary plunger 252 such that recoil damper 250 may again dissipate energy and provide a supplemental damping force (e.g., as the vehicle interacts with a subsequent positive or negative obstacle). As return spring 256 extends, fluid is drawn from extension chamber 270 into recoil chamber 272 such that fluid is again available to flow through the conduit, dissipate energy, and provide a supplemental damping force. According to an alternative embodiment, recoil damper 250 does not include return spring 256 and secondary plunger 252 travels downward toward step 231 due to another force (e.g., coupling forces between plunger 240 and secondary plunger 252, gravitation forces, etc.).

As shown in FIG. 4D, translation of plunger 240 along direction of travel 282 from the position shown in FIG. 4C separates plunger 240 from secondary plunger 252. According to an alternative embodiment, plunger 240 maintains engagement with secondary plunger 252 until secondary plunger 252 engages step 231. According to an exemplary embodiment, damping groove 253 facilitates separation of plunger 240 from secondary plunger 252 as plunger 240 translates along direction of travel 282. Damping groove 253 reduces the risk that coupling forces will lock plunger 240 to secondary plunger 242 (e.g., due to contact between the two otherwise smooth corresponding surfaces). Such coupling forces may otherwise result in the translation of secondary plunger 252 along the length of housing 230 with plunger 240, the combination of secondary plunger 252 and plunger 240 providing supplemental damping forces in unintended stroke positions (e.g., in locations other than at an end of housing 230, etc.).

Figure 5:
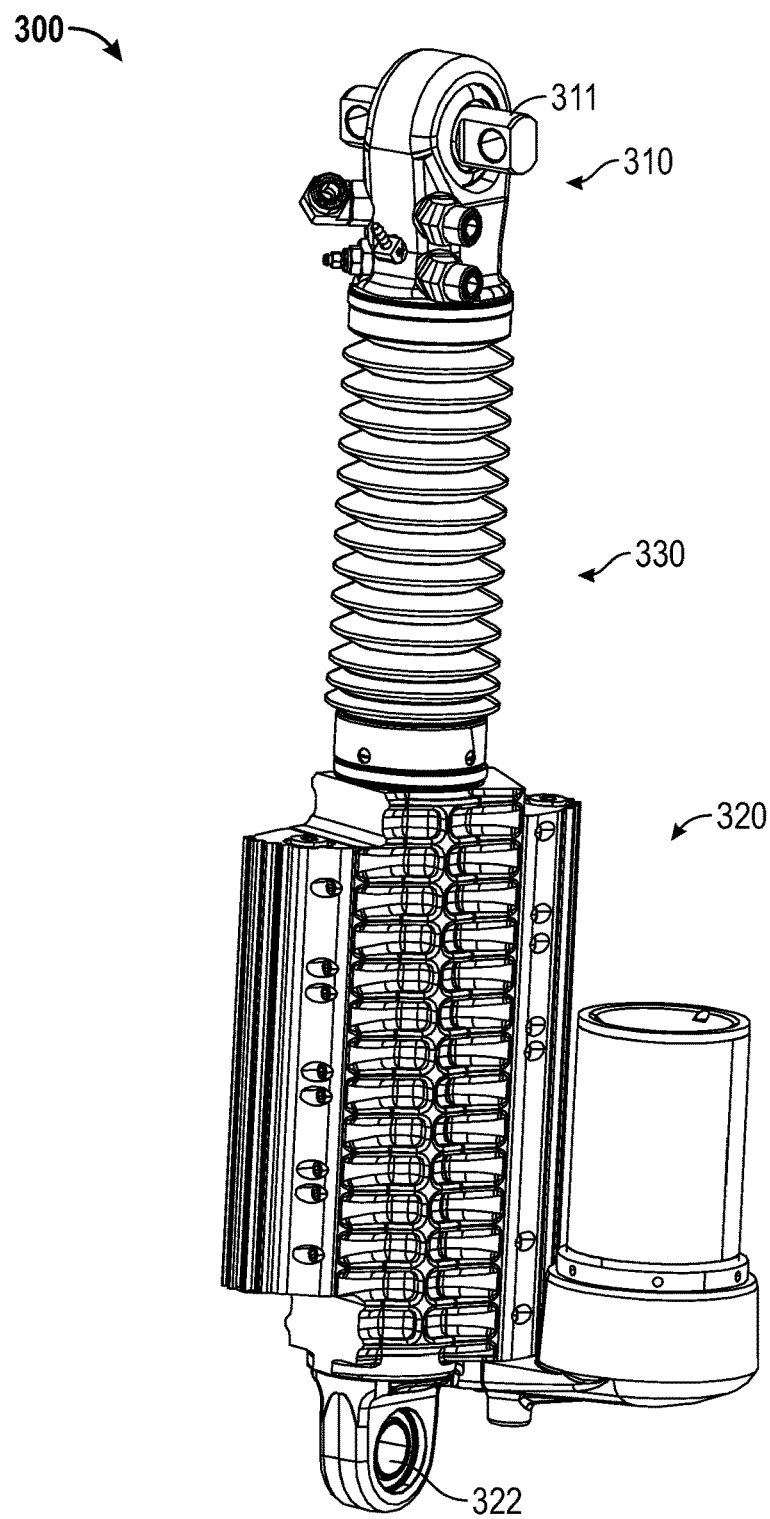
FIG. 5 is an elevation view of a damper assembly, according to an exemplary embodiment.
Figure 6:
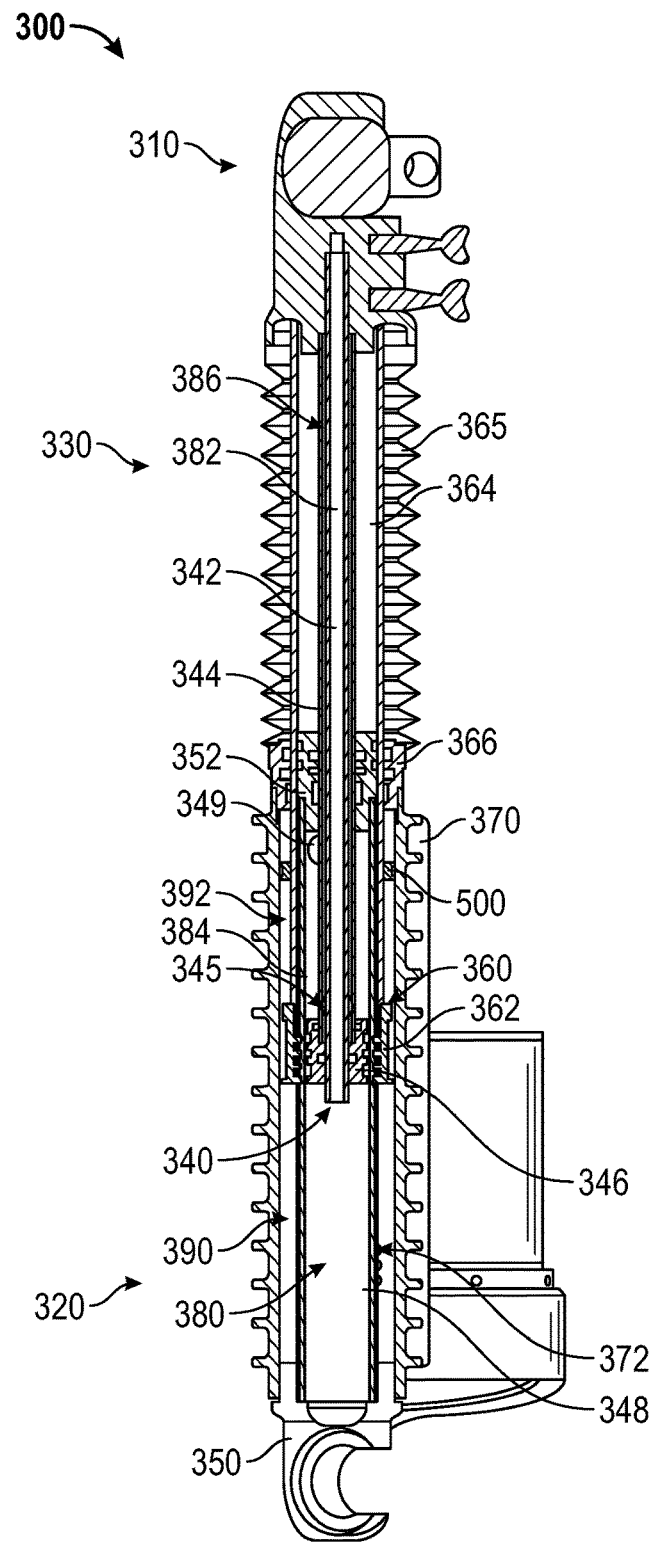
FIGS. 6-11 are partial sectional views of a damper assembly having a recoil damper in various stages of compression, according to an exemplary embodiment.

Referring next to the exemplary embodiment shown in FIGS. 5-6, a damper, shown as damper assembly 300, includes a manifold 310 coupled to a body portion 320 with a shaft 330. As shown in FIG. 5, manifold 410 includes an interface, shown as joint 311, that is configured to engage a portion of the vehicle (e.g., the chassis, a hull, etc.). The body portion 320 defines an interface 322 that is configured to engage another portion of the vehicle (e.g., a lower swing arm, etc.). According to an exemplary embodiment, damper assembly 300 is a coaxially integrated double damper that facilitates the spring force compensation strategy while providing damping forces that vary based on the position of the damping piston.

As shown in FIG. 6, damper assembly 300 includes a base damper assembly (i.e. an inner damper assembly), shown as primary damper 340, and a supplemental damper, shown as secondary damper 360. According to an exemplary embodiment, the primary damper 340 provides roll control and base damping through an inner damper circuit and the secondary damper 360 provides position dependent damping through an outer damping circuit. The secondary damper 360 provides damping forces that are independent of those provided by primary damper 340. According to an exemplary embodiment, the damping forces provided by secondary damper 360 are negligible in conditions where the primary damper 340 alone is designed to provide damping forces. The damper assembly 300 includes a limiter, shown as recoil damper 500, that is configured to engage the secondary damper 360. According to an exemplary embodiment, recoil damper 500 dissipates energy and provides a supplemental damping force. As shown in FIG. 6, the primary damper 340 and the secondary damper 360 are integrated into a single unit thereby reducing the size and weight of damper assembly 300. According to an exemplary embodiment, the primary damper 440 and the secondary damper 460 are positioned coaxially, which further reduces the size of damper assembly 440 (e.g., relative to two dampers positioned in parallel).

According to an exemplary embodiment, the primary damper 340 includes a first tubular member 342 positioned within a second tubular member 344. As shown in FIG. 6, a first piston, shown as plunger 346 is coupled to an end of first tubular member 342 and second tubular member 344. The primary damper 340 includes a third tubular member 348 at least partially surrounding the second tubular member 344. An aperture, shown as aperture 349, extends through a sidewall of the third tubular member 348. According to an exemplary embodiment, plunger 346 is slidably coupled to an inner surface of third tubular member 348. A cap 350 and a cap 352 are coupled to opposing ends of third tubular member 348. As shown in FIG. 6 an outer surface of second tubular member 344 is positioned within an aperture defined by cap 352.

As shown in FIG. 6, the secondary damper 360 includes a housing, shown as housing 370, a second piston, shown as plunger 362, and a tubular member 364. A cover, shown as bellow 365, is disposed around tubular member 364 to prevent debris from entering body portion 320 or manifold 310. According to an exemplary embodiment, housing 370 defines a plurality of apertures, shown as openings 372. According to an exemplary embodiment, conduits hydraulically couple a portion of the openings 372 to other openings 372 thereby forming at least one hydraulic circuit.

According to an exemplary embodiment, the tubular member 364 is positioned coaxially with the first tubular member 342 and the second tubular member 344. An end cap 366 is coupled to an end of housing 370, and the tubular member 364 is slidably coupled between the cap 352 and the end cap 366. According to an exemplary embodiment, plunger 362 has an annular shape that defines an aperture extending therethrough. The plunger 362 is disposed between an inner surface of the housing 370 and an outer surface of third tubular member 348. As shown in FIG. 6, an aperture, shown as aperture 345, extends through a sidewall of the second tubular member 344. It should be understood that the components of damper assembly 300 may have various cross-sectional shapes (e.g., cylindrical, rectangular, square, hexagonal, etc.). According to an exemplary embodiment, the components of damper assembly 300 are coupled with seals (e.g., bushings, wear bands, o-rings, etc.) that are configured to prevent pressurized fluid from passing between the chambers discussed herein or leaking out of damper assembly 300.

Referring again to FIG. 6, primary damper 340 and secondary damper 360 define a plurality of flow channels. According to an exemplary embodiment, primary damper 340 defines a compression chamber 380 that is formed by an inner surface of third tubular member 348, cap 350, an end of first tubular member 342, and a first face of plunger 346. A flow channel 382 is defined by an inner surface of first tubular member 342 from the compression chamber 380, through manifold 310, and through a first flow port 312. According to an exemplary embodiment, the primary damper 340 includes an extension chamber 384 defined by an inner surface of tubular member 364, a second face of plunger 346, a portion of plunger 362, and a face of cap 352. It should be understood that aperture 345 and aperture 349 facilitate the formation of extension chamber 384 by placing various internal chambers in fluid communication. A flow channel 386 is defined by an inner surface of second tubular member 344, an outer surface of first tubular member 342, manifold 310, and a second flow port 314. According to an exemplary embodiment, the flow channel 382 and the flow channel 386 form the inner damper circuit. An inner surface of the housing 370, cap 350, an outer surface of third tubular member 348, and a first surface of plunger 362 define a secondary compression chamber 390, and the inner surface of the housing 370, end cap 366, an outer surface of tubular member 364, and a second surface of plunger 362 define a secondary extension chamber 392.

Extension and retraction of the damper assembly 300 provides relative movement between a first set of components (e.g., plunger 346, first tubular member 342, second tubular member 344, tubular member 364, end cap 366, etc.) relative to a second set of components (e.g., housing 370, cap 350, third tubular member 348, cap 352, etc.). Such extension and retraction causes fluid to flow through the flow channel 382 and flow channel 386 in opposite directions (e.g., fluid flows into compression chamber 380 and out of extension chamber 384 as the damper assembly 300 is extended). According to an exemplary embodiment, the area of plunger 346 and the area of first tubular member 342 exposed to compression chamber 380 is approximately equal to the area of plunger 346 and the area of plunger 362 that are exposed to extension chamber 384 thereby providing a one-to-one working area ratio.

Extension and retraction of the damper assembly 300 also provides relative movement between plunger 362 and housing 370. According to an exemplary embodiment, plunger 362 is coupled to plunger 346 (e.g., with tubular member 364, manifold 310, and first tubular member 342). As damper assembly 300 is compressed, fluid is forced from secondary compression chamber 390, through a first set of openings 372 to a second set of openings 372 via a conduit, and into a secondary extension chamber 392. As damper assembly 300 is extended, fluid is forced from secondary extension chamber 392, through a first set of openings 372 to a second set of openings 372 via a conduit, and into secondary compression chamber 390. Fluid is forced through specific openings 372 based on the position of plunger 362 within housing 370. Certain sets of openings may be deactivated (e.g., due to hydraulic lock, because a set of the openings is obstructed by plunger 362, etc.). According to an exemplary embodiment, valves (e.g., bidirectional flow valves, etc.) may be positioned within the conduits that couple the openings 372. According to an exemplary embodiment, secondary damper 360 provides damping forces that vary based on the position of plunger 362 and the direction that plunger 362 is traveling.

Figure 7:
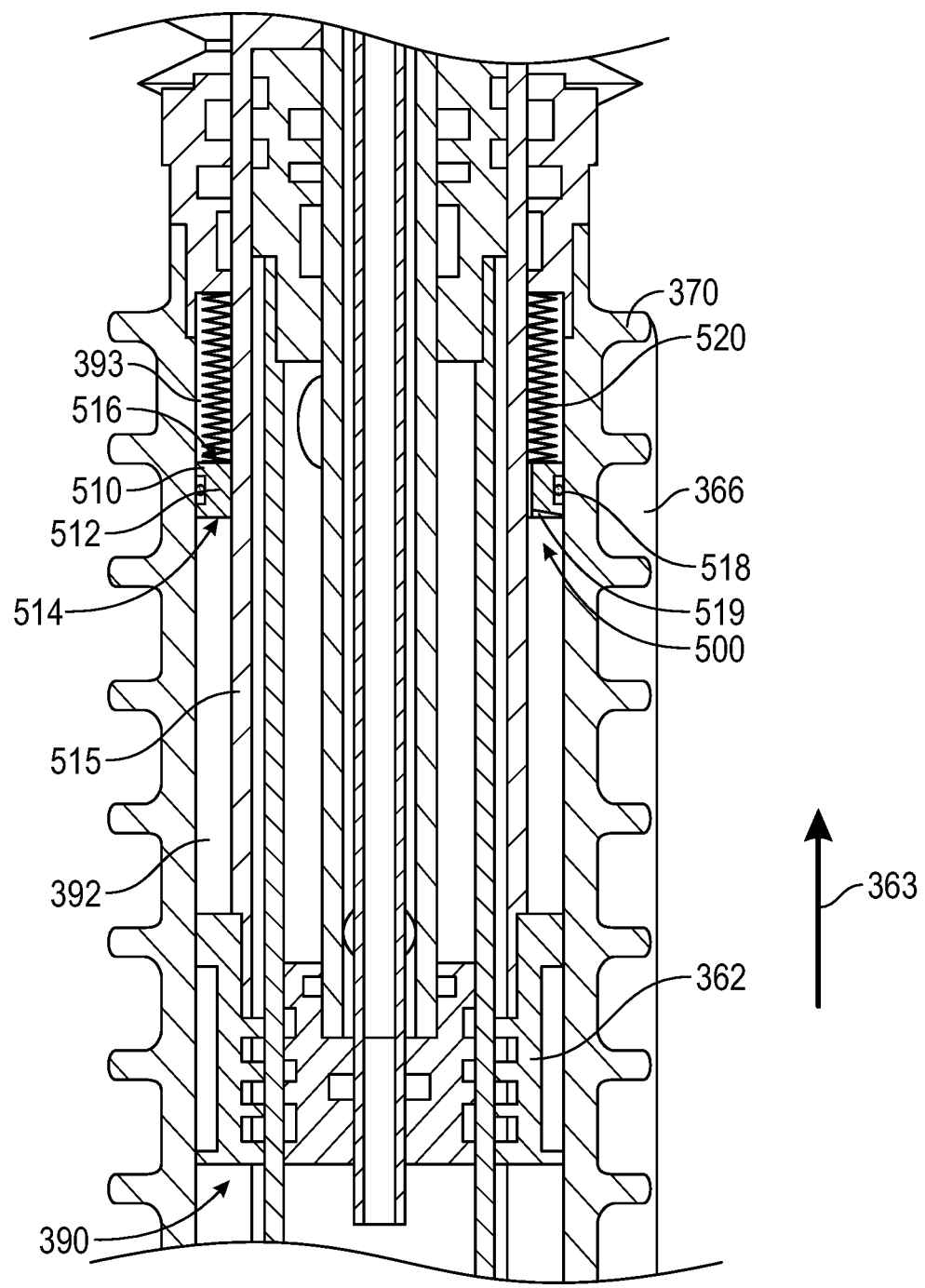

Referring to the exemplary embodiment shown in FIGS. 7-11, recoil damper 500 is positioned between plunger 362 and end cap 366. As shown in FIG. 7, recoil damper 500 includes a piston, shown as secondary plunger 510. According to an exemplary embodiment, secondary plunger 510 includes an annular body member 512 that has a contact surface 514, an inner cylindrical face 515, and an opposing surface 516. As shown in FIG. 7, contact surface 514 and opposing surface 516 are separated by a thickness of annular body member 512. The recoil damper 500 includes a resilient member, shown as return spring 520. As shown in FIG. 7, return spring 520 extends between a first end that engages secondary plunger 510 and a second end that engages end cap 366. Return spring 520 may be an interlaced wave spring (i.e. a flat wire compression spring), a coil spring, or another type of spring. Return spring 520 positions secondary plunger 510 within housing 370, according to an exemplary embodiment. According to an exemplary embodiment, secondary plunger 510 is coupled to an inner sidewall of housing 370 with a seal (e.g., ring, wear band, guide ring, wear ring, etc.), shown as interfacing member 518. A recoil chamber 393 is formed by the volume of secondary extension chamber 392 located between secondary plunger 510 and end cap 366.

According to an exemplary embodiment, secondary plunger 510 defines a channel (i.e. track, depression, kerf, notch, opening, recess, slit, etc.), shown as damping groove 519. As shown in FIG. 7, damping groove 519 extends radially outward across contact surface 514 of secondary plunger 510. According to an alternative embodiment, damping groove 519 extends radially outward across contact surface 514 and along inner cylindrical face 515. According to still another alternative embodiment, damping groove 519 extends radially outward across contact surface 514, along inner cylindrical face 515, and across opposing surface 516. As shown in FIG. 7, secondary plunger 510 defines a single damping groove 519. According to an alternative embodiment, secondary plunger 510 defines a plurality of damping grooves 519.

Figure 8A:
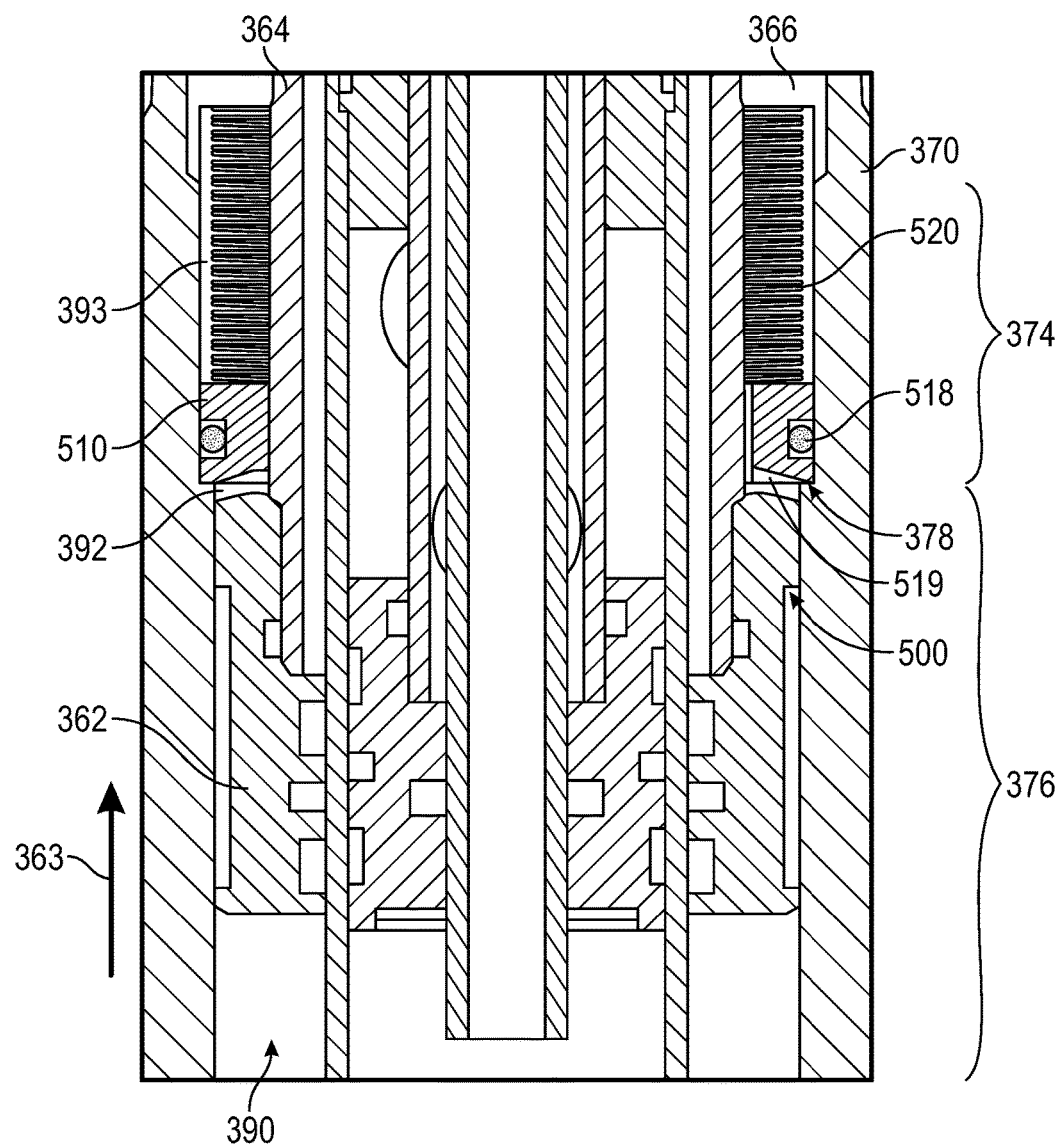

As shown in FIG. 8A, the sidewall of housing 370 includes first portion 374 having a first diameter and a second portion 376 having a second diameter, the transition between the first diameter and the second diameter forming a shoulder, shown as step 378. According to an exemplary embodiment, the length of first portion 374 defines the distance over which recoil damper 500 dissipates energy and provides a supplemental damping force. As shown in FIG. 8A, secondary plunger 362 is coupled to the first portion with an interfacing member 518. As shown in FIG. 8A, the diameter of secondary plunger 510 is greater than the second diameter such that the secondary plunger 510 translates only within first portion 374 of housing 370. Step 378 thereby limits the motion of secondary plunger 510 and prevents secondary plunger 510 from sliding (e.g., due to gravity, due to locking forces between secondary plunger 510 and plunger 362, etc.) toward an opposing end of housing 370. According to an exemplary embodiment, plunger 362 has a diameter that is approximately equal to the second diameter and is configured to translate along both first portion 374 and second portion 376 of housing 370. In some embodiments, plunger 362 is coupled to housing 370 with an intermediate seal.

Figure 8B:
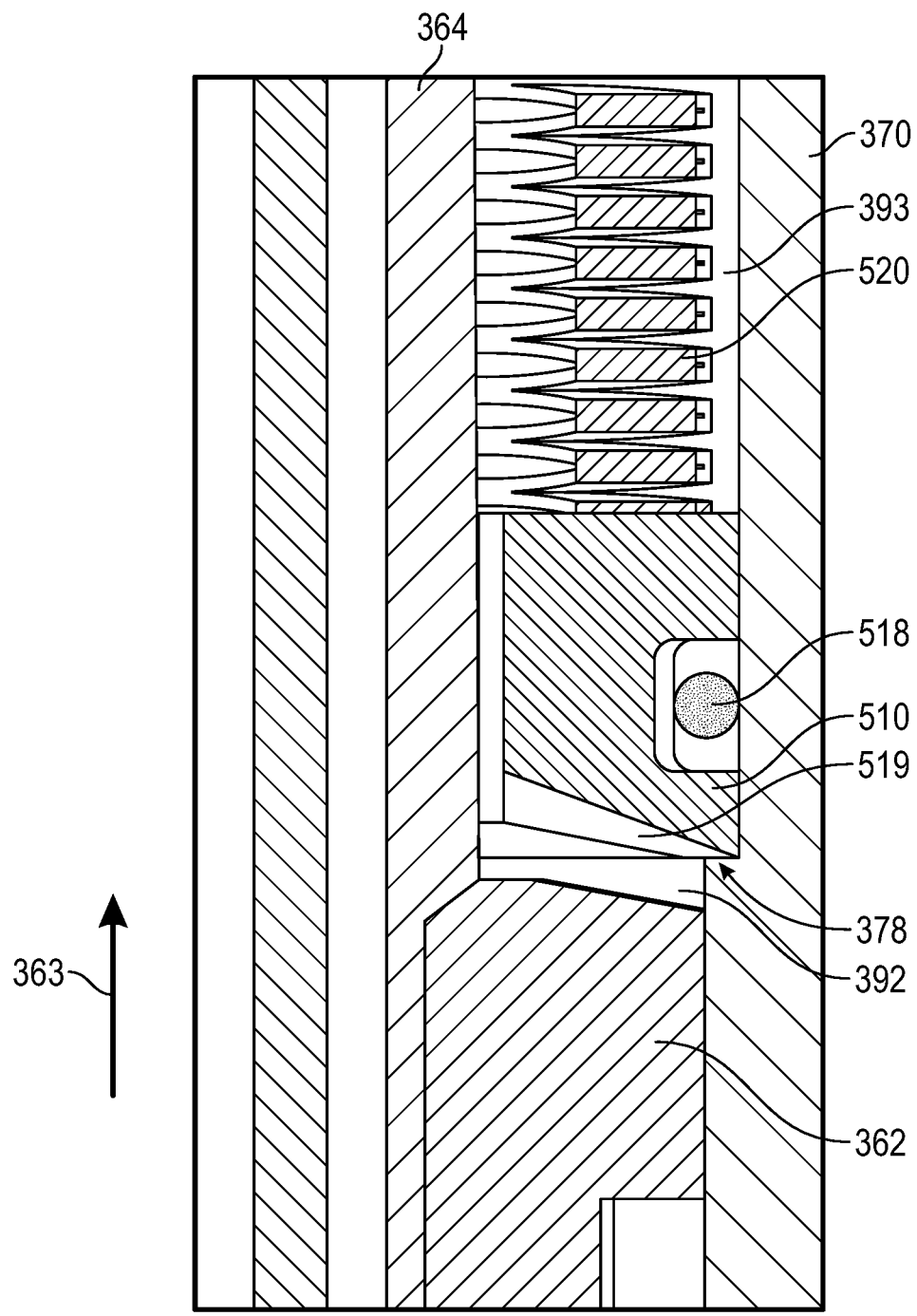
Figure 9:
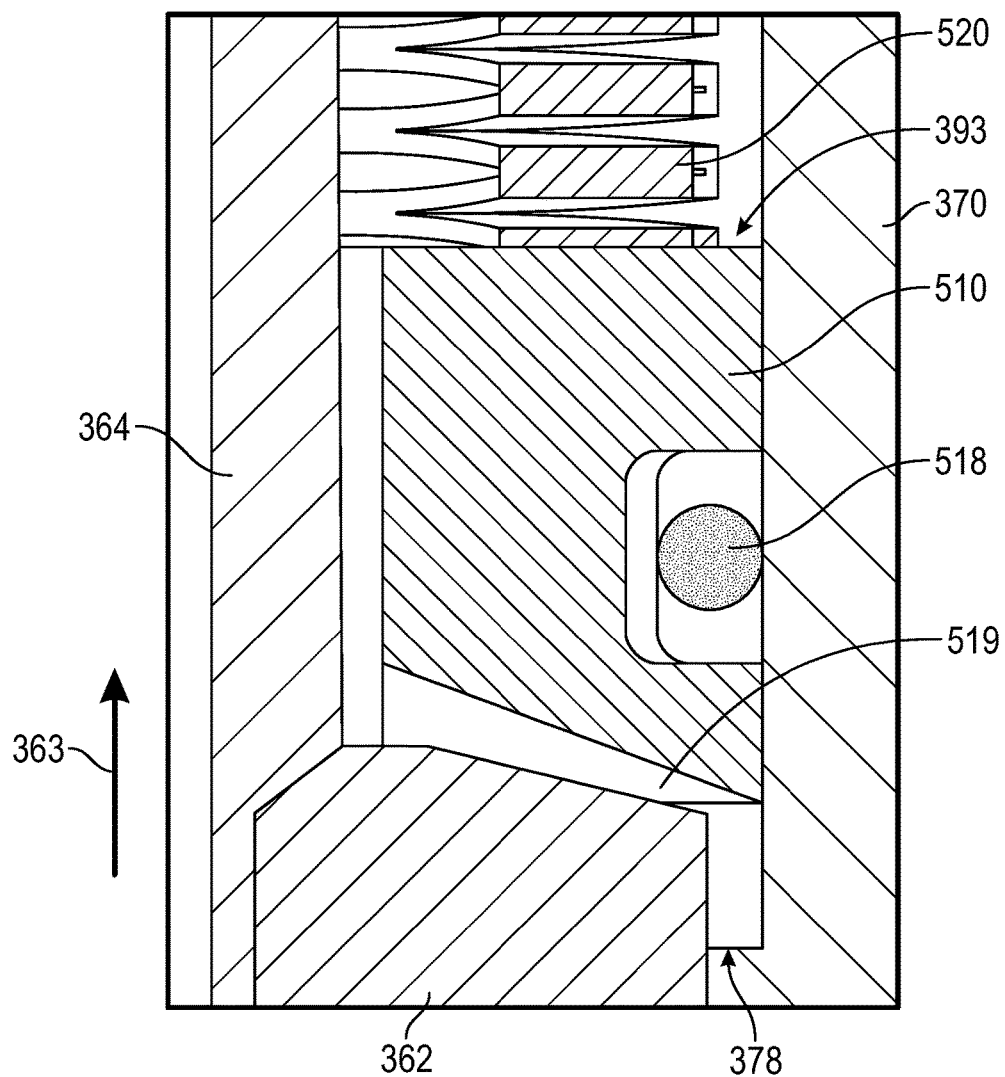
Figure 10:
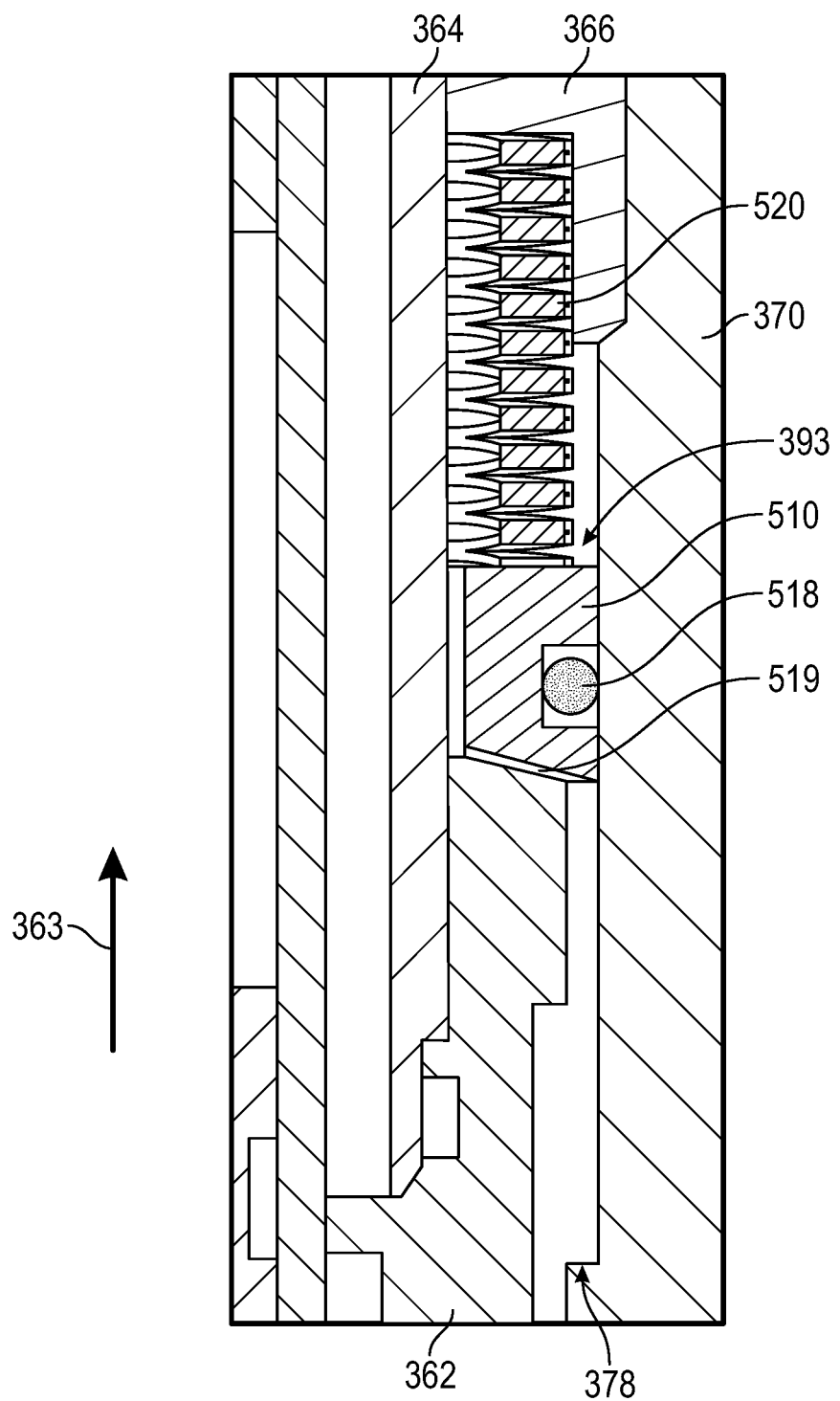

Plunger 362 translates toward end cap 366 along direction of travel 363 as damper assembly 300 is extended. As shown in FIGS. 8A-8B, secondary plunger 510 is biased by return spring 520 into engagement with step 378. According to an exemplary embodiment, plunger 362 engages secondary plunger 510, forces secondary plunger 510 from step 378, and compresses return spring 520. The pressure of fluid disposed within recoil chamber 393 is increased as secondary plunger 510 translates along direction of travel 363. The fluid from recoil chamber 393 flows between secondary plunger 510 and tubular member 364, through a conduit formed by damping groove 519 and a contact surface of plunger 362, between first portion 374 and plunger 362, and into secondary compression chamber 390.

Figure 11:
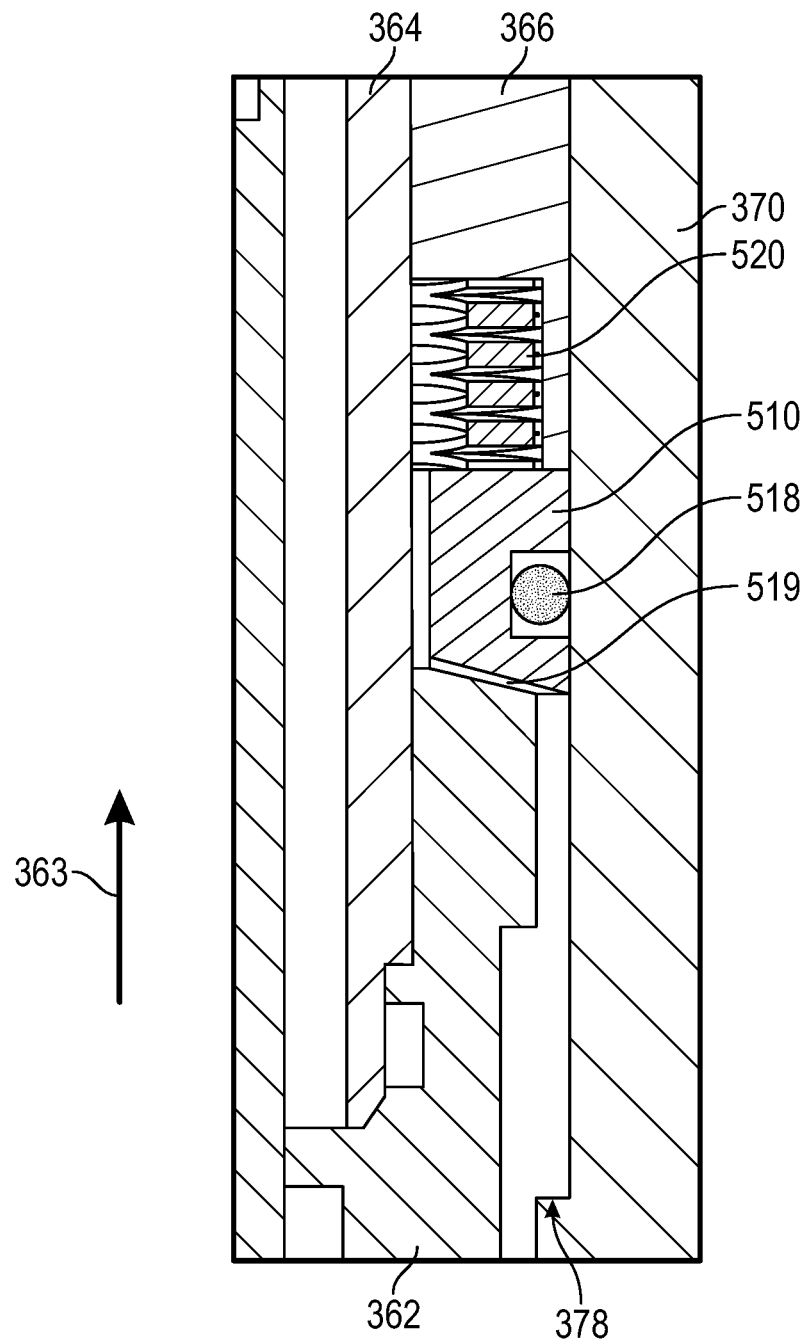

According to an exemplary embodiment, the conduit restricts fluid flow thereby dissipating energy and providing a damping force. As damper assembly 300 extends, plunger 362 and secondary plunger 510 translate along direction of travel 363 toward end cap 366. According to an exemplary embodiment, end cap 366 is a hard stop for damper assembly 300. As shown in FIG. 11, plunger 362 and secondary plunger 510 translate along direction of travel 363 until a surface of secondary plunger 510 contacts end cap 366. Return spring 520 nests within end cap 366 as secondary plunger 510 translates along direction of travel 363. It should be understood that return spring 520 forces secondary plunger 510 toward step 378 as plunger 362 translates away from end cap 366 thereby repositioning secondary plunger 510 to again interact with plunger 362 during a supplemental end of stroke event.

Figure 12:
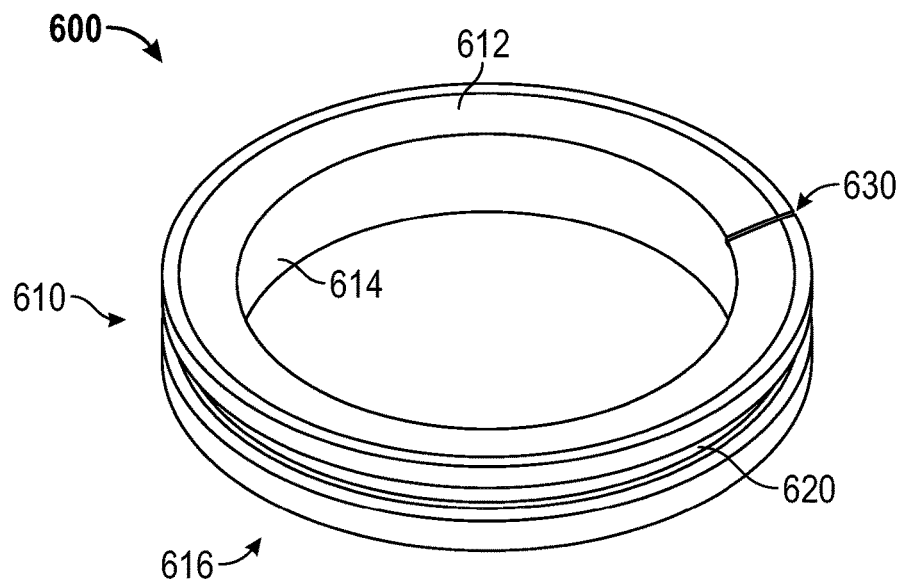
FIG. 12 is an elevation view of a secondary plunger having a damping groove, according to an exemplary embodiment.
Figure 13:
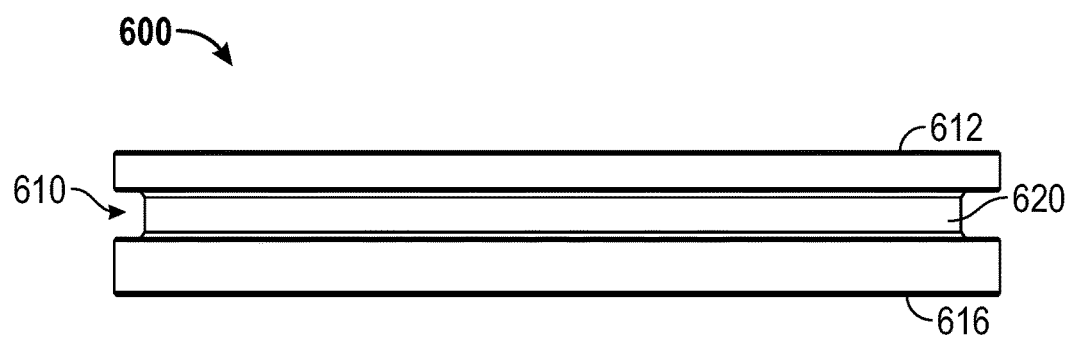
FIG. 13 is a side plan view of a secondary plunger, according to an exemplary embodiment.
Figure 14:
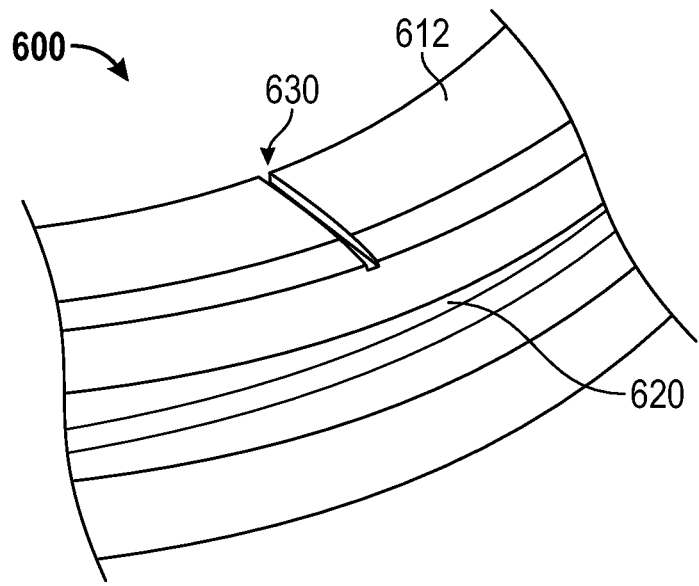
FIG. 14 is an elevation view of a portion of a secondary plunger having a damping groove, according to an exemplary embodiment.

Referring next to the exemplary embodiment shown in FIGS. 12-15, a piston, shown as plunger 600, includes an annular body member 610 that has a contact surface 612, an inner cylindrical face 614, and an opposing surface 616. According to an exemplary embodiment, plunger 600 is implemented as part of a limiter for a suspension component. As shown in FIGS. 12 and 14, contact surface 612 includes an outer annular portion that is parallel to opposing surface 616 and an inclined portion that is angled relative to the outer annular portion of contact surface 612. The inclined portion extends radially inward and toward opposing surface 616 from the outer annular portion of contact surface 612. A channel, shown as groove 620, is defined within an outer annular surface of annular body member 610 (e.g., to receive a seal, etc.).

As shown in FIG. 12, plunger 600 includes a channel (i.e. track, depression, kerf, notch, opening, recess, slit, etc.), shown as damping groove 630, extending radially outward from a centerline of annular body member 610 across contact surface 612. According to an alternative embodiment, damping groove 630 extends radially outward across contact surface 612 and along inner cylindrical face 614. According to still another alternative embodiment, damping groove 630 extends radially outward across contact surface 612, along inner cylindrical face 614, and across opposing surface 616.

Figure 15:
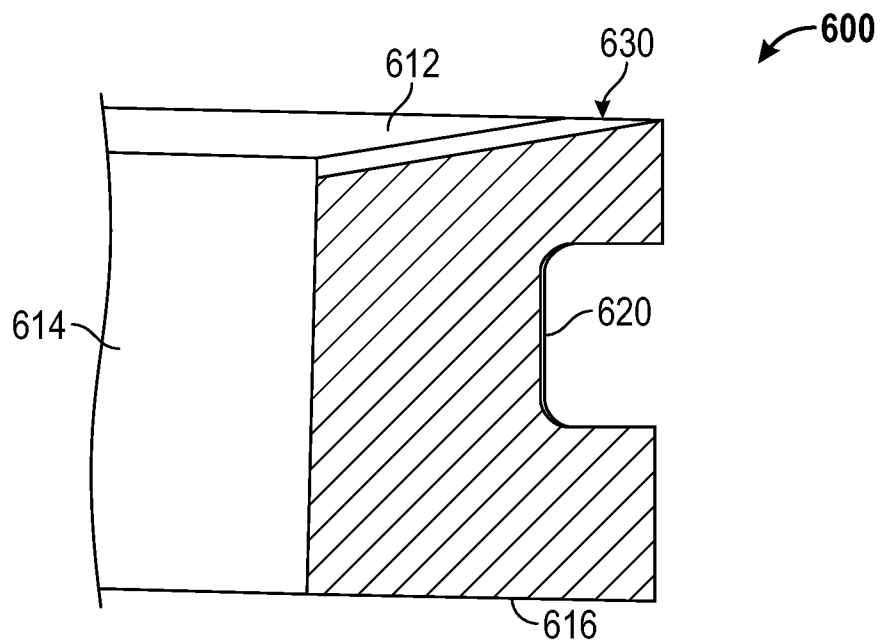
FIG. 15 is a sectional view of a secondary plunger having a damping groove, according to an exemplary embodiment.

Damping groove 630 is configured to interface with a contact surface of a plunger and form a conduit to dissipate energy and provide damping forces. As shown in FIG. 15, damping groove 630 is parallel to the inclined portion of contact surface 612. According to an exemplary embodiment, plunger 600 defines a single damping groove 630. According to an alternative embodiment, plunger 600 a plurality of damping grooves 630. Damping groove 630 is sized to provide particular flow characteristics. According to an exemplary embodiment, damping groove 630 is defined along an axis extending radially outward from a centerline of annular body member 610. According to an alternative embodiment, damping groove 630 is curvilinear or irregularly shaped. According to an exemplary embodiment, damping groove 630 has a square cross-sectional shape (e.g., 0.020 inches square) in a plane that is normal to the axis along the length of damping groove 630. According to an alternative embodiment, damping groove 630 has another cross-sectional shape (e.g., rectangular, circular, semicircular, parabolic, etc.).

The construction and arrangements of the damper, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A damper assembly, comprising:
    a tubular member including a sidewall and a cap positioned at an end of the sidewall, the sidewall and the cap defining an inner volume, wherein the sidewall includes a shoulder separating the tubular member into a first portion and a second portion;
a rod extending within the inner volume;
a primary piston positioned within the inner volume and coupled to the rod, the primary piston defining a first contact surface;
a secondary piston including a body member having a second contact surface, an opposing second surface, and an inner cylindrical face defining a central aperture that receives the rod, the secondary piston defining a channel extending from the inner cylindrical face to an outer periphery of the body member, wherein the primary piston and the secondary piston separate the inner volume into a first working chamber, a second working chamber, and a recoil chamber;
a resilient member disposed between the secondary piston and the cap and thereby positioned to bias the secondary piston into engagement with the shoulder; and
a seal disposed between the outer periphery of the secondary piston and the sidewall of the tubular member;
wherein the first contact surface and the channel are configured to cooperatively define a flow conduit upon engagement between the primary piston and the secondary piston;
wherein the second contact surface is configured to engage the first contact surface such that an open flow path is formed from the recoil chamber through the central aperture and the flow conduit upon engagement between the primary piston and the secondary piston.

2. The damper assembly of claim 1, wherein the recoil chamber is defined between the opposing second surface of the secondary piston and the cap.

3. The damper assembly of claim 1, wherein the primary piston, the first portion, and the second portion have circular cross-sectional shapes.

4. The damper assembly of claim 3, wherein the first portion has a first diameter and the second portion has a second diameter, wherein the first diameter is greater than the second diameter, and wherein the transition between the first portion and the second portion defines the shoulder.

5. The damper assembly of claim 4, wherein the diameter of the primary piston is less than the second diameter such that the primary piston is extendable along the length of the tubular member.

6. A damper assembly, comprising:
a housing having an end cap and defining an inner volume including a first portion and a second portion, wherein the transition between the first portion and the second portion defines a shoulder;
a primary piston positioned within the housing; and
a limiter positioned between the primary piston and the end cap, the limiter comprising:
 a damper piston including a body member having a contact surface, an opposing second surface, and an inner cylindrical face that defines an aperture through a central portion of the body member, the primary piston and the damper piston separating the inner volume into a first working chamber, a second working chamber, and a recoil chamber;
 a resilient member disposed within the recoil chamber, between the opposing second surface of the damper piston and the end cap, the resilient member thereby positioned to bias the damper piston into engagement with the shoulder; and
 a ring coupling the damper piston to the housing, wherein the ring comprises a seal; and
a rod coupled to the primary piston and extending through the aperture defined by the damper piston;
wherein the damper piston defines a channel extending laterally outward from the inner cylindrical face across the contact surface to an outer periphery of the body member, wherein the primary piston and the channel are configured to cooperatively define a first flow conduit upon engagement between the primary piston and the damper piston; and
wherein an outer surface of the rod and the inner cylindrical face of the damper piston define a second flow conduit, and wherein the first flow conduit and the second flow conduit cooperate to define an open flow path from the recoil chamber.

7. The damper assembly of claim 6, wherein the primary piston is moveable within the housing between a first location, an intermediate location, and an end of stroke, and wherein the primary piston is configured to maintain engagement with the limiter between the intermediate location and the end of stroke.

8. The damper assembly of claim 7, wherein the damper assembly provides a base level of damping as the primary piston moves between the first location and the intermediate location and an increased level of damping as the primary piston moves between the intermediate location and the end of stroke.

9. The damper assembly of claim 6, wherein the recoil chamber is defined between the opposing second surface of the damper piston and the end cap.

10. The damper assembly of claim 1, wherein the primary piston is moveable within the tubular member between a first location, an intermediate location, and an end of stroke, and wherein the primary piston is configured to maintain engagement with the secondary piston between the intermediate location and the end of stroke.

11. The damper assembly of claim 10, wherein the damper assembly provides a base level of damping as the primary piston moves between the first location and the intermediate location and an increased level of damping as the primary piston moves between the intermediate location and the end of stroke.

12. The damper assembly of claim 1, wherein the primary piston is coupled to an end of the rod.

13. The damper assembly of claim 6, wherein the primary piston, the first portion, and the second portion have circular cross-sectional shapes.

14. The damper assembly of claim 13, wherein the first portion has a first diameter and the second portion has a second diameter, wherein the first diameter is greater than the second diameter, and wherein the transition between the first portion and the second portion defines the shoulder.

15. The damper assembly of claim 14, wherein the diameter of the primary piston is less than the second diameter such that the primary piston is extendable along the length of the housing.

16. The damper assembly of claim 6, wherein an end of the rod is coupled to the primary piston.

17. The damper assembly of claim 6, wherein the seal is a polymeric seal.

* * * * *